(12) United States Patent
Schuh

(10) Patent No.: US 10,509,302 B2
(45) Date of Patent: Dec. 17, 2019

(54) SHORT THROW PROJECTOR MOUNT WITH ADJUSTABLE SCREW DRIVE

(71) Applicant: Milestone AV Technologies LLC, Eden Prairie, MN (US)

(72) Inventor: Mathew Schuh, Eden Prairie, MN (US)

(73) Assignee: Legrand AV Inc., Eden Prairie, MN (US)

( * ) Notice: Subject to any disclaimer, the term of this patent is extended or adjusted under 35 U.S.C. 154(b) by 69 days.

(21) Appl. No.: 15/568,721

(22) PCT Filed: Apr. 25, 2016

(86) PCT No.: PCT/US2016/029262
§ 371 (c)(1),
(2) Date: Oct. 23, 2017

(87) PCT Pub. No.: WO2016/172732
PCT Pub. Date: Oct. 27, 2016

(65) Prior Publication Data
US 2018/0136547 A1    May 17, 2018

Related U.S. Application Data

(60) Provisional application No. 62/151,789, filed on Apr. 23, 2015.

(51) Int. Cl.
| F16M 11/12 | (2006.01) |
| G03B 21/14 | (2006.01) |
| G03B 21/54 | (2006.01) |
| F16M 11/10 | (2006.01) |
| F16M 11/18 | (2006.01) |
| F16M 11/20 | (2006.01) |

(Continued)

(52) U.S. Cl.
CPC .......... *G03B 21/145* (2013.01); *F16M 11/10* (2013.01); *F16M 11/12* (2013.01); *F16M 11/18* (2013.01); *F16M 11/2071* (2013.01); *F16M 11/24* (2013.01); *F16M 13/027* (2013.01); *G03B 21/54* (2013.01)

(58) Field of Classification Search
USPC ...................................... 248/176.3
See application file for complete search history.

(56) References Cited

U.S. PATENT DOCUMENTS

| 4,473,291 A | 9/1984 | Wally |
| 5,253,834 A * | 10/1993 | Sullivan ................. F16M 11/10 |
| | | 248/179.1 |

(Continued)

FOREIGN PATENT DOCUMENTS

| EP | 1 852 646 A2 | 5/2007 |
| WO | WO 00/44063 A1 | 7/2000 |

OTHER PUBLICATIONS

Extended European Search Report for Application No. 16784111.3, dated Dec. 10, 2018 (8 pgs).

(Continued)

*Primary Examiner* — Monica E Millner
(74) *Attorney, Agent, or Firm* — Bradley J. Thorson

(57) ABSTRACT

A projector mount with controls enabling quick selection between course alignment of the projector by hand about any of three positioning axes—pitch, yaw, and roll—and precision adjustment of projector position about any one or more of the axes, once the course alignment has been completed.

13 Claims, 34 Drawing Sheets

(51) Int. Cl.
*F16M 11/24* (2006.01)
*F16M 13/02* (2006.01)

(56) References Cited

U.S. PATENT DOCUMENTS

| | | | | |
|---|---|---|---|---|
| 5,938,161 A * | 8/1999 | Takeuchi | ............ | F16M 11/105 248/329 |
| 6,042,068 A * | 3/2000 | Tcherny | ................ | F16M 11/08 248/221.11 |
| 6,485,144 B1 * | 11/2002 | Liao | ...................... | G03B 21/00 348/151 |
| 6,883,920 B2 * | 4/2005 | Chen | .................... | G03B 21/001 348/745 |
| 7,156,359 B2 * | 1/2007 | Dittmer | ............... | F16M 11/041 248/551 |
| 7,891,624 B2 * | 2/2011 | Dittmer | ............... | F16M 11/041 248/292.12 |
| 8,033,519 B2 * | 10/2011 | David | ................ | F16M 11/043 248/222.11 |
| 8,138,469 B2 * | 3/2012 | Dittmer | ............... | F16M 11/041 250/221 |
| 8,573,551 B2 | 11/2013 | Hung | | |
| 8,894,222 B2 * | 11/2014 | Kelly | .................. | G03B 21/142 348/373 |
| 9,164,364 B2 * | 10/2015 | Chang | .................. | G03B 21/145 |
| 2005/0161575 A1 * | 7/2005 | Friederich | ............ | F16M 11/043 248/519 |
| 2008/0179475 A1 | 7/2008 | Whitley et al. | | |
| 2011/0108692 A1 | 5/2011 | Dittmer et al. | | |
| 2011/0162468 A1 | 7/2011 | Lin | | |
| 2011/0297809 A1 * | 12/2011 | Bouissiere | .......... | F16M 11/043 248/274.1 |
| 2012/0224152 A1 | 9/2012 | Kelly | | |
| 2014/0077053 A1 | 3/2014 | Chang | | |

OTHER PUBLICATIONS

Canadian Office Action for Application No. 2,983,766 dated Aug. 28, 2018 (3 pgs).
International Search Report and Written Opinion for Application No. PCT/US2016/029262, dated Jul. 28, 2016.

* cited by examiner

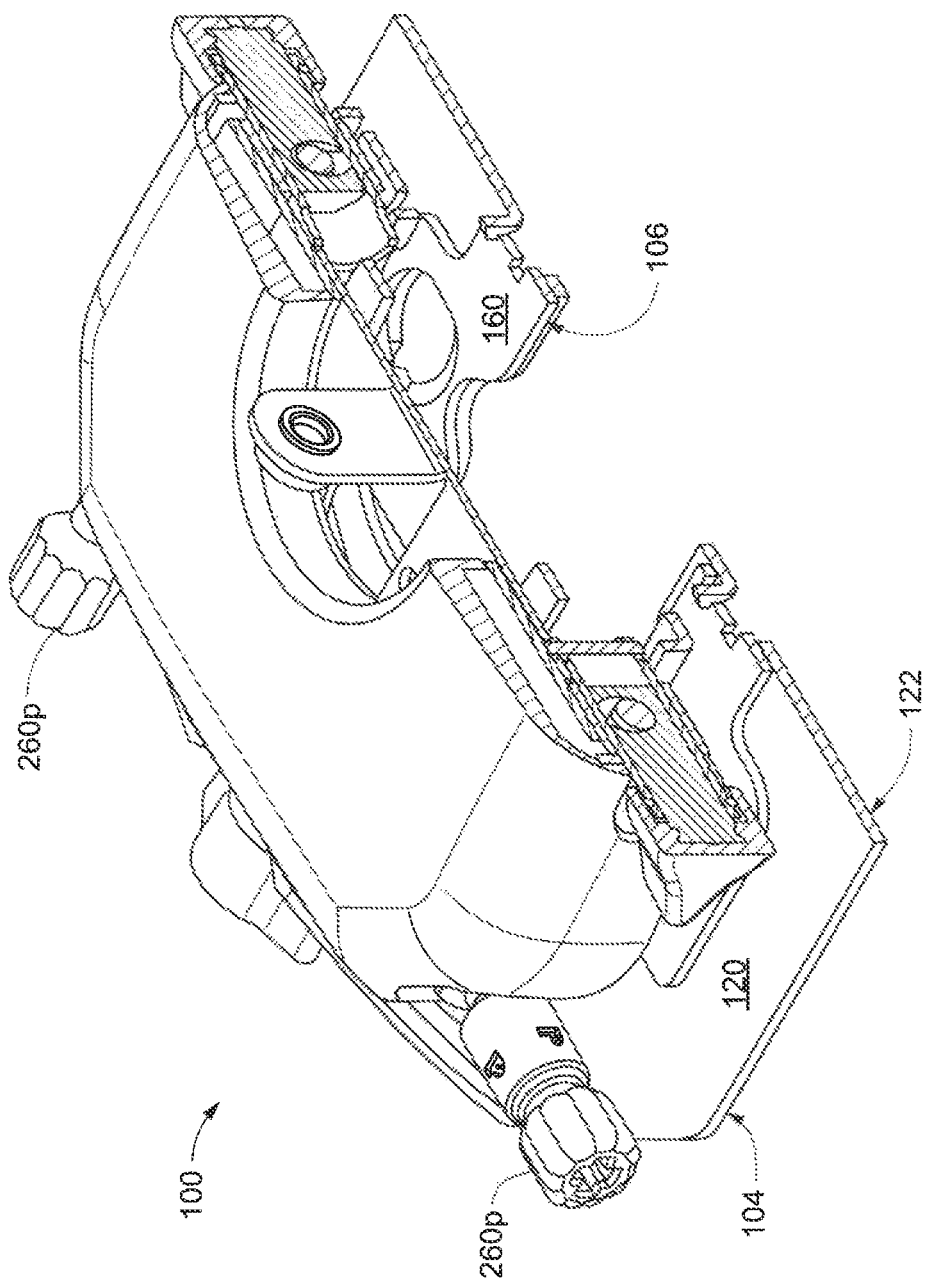

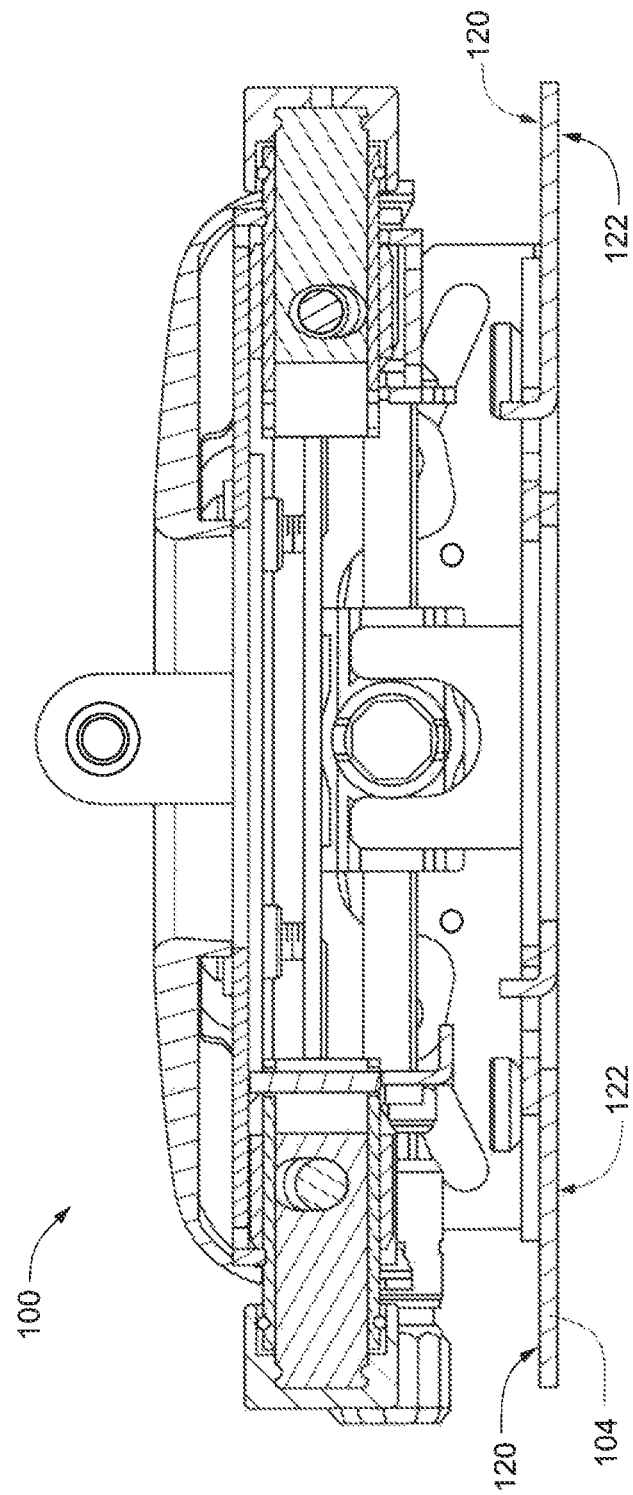

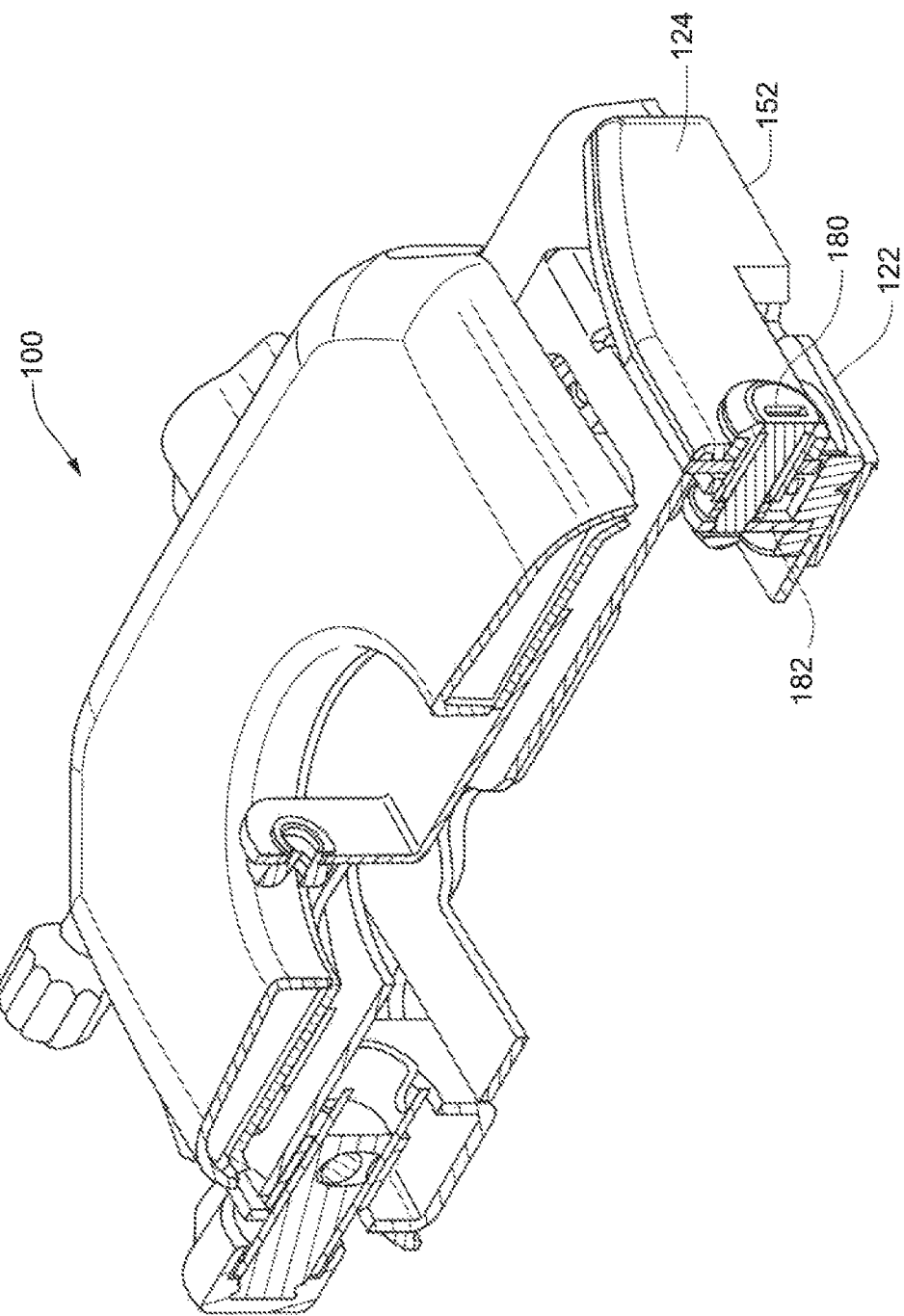

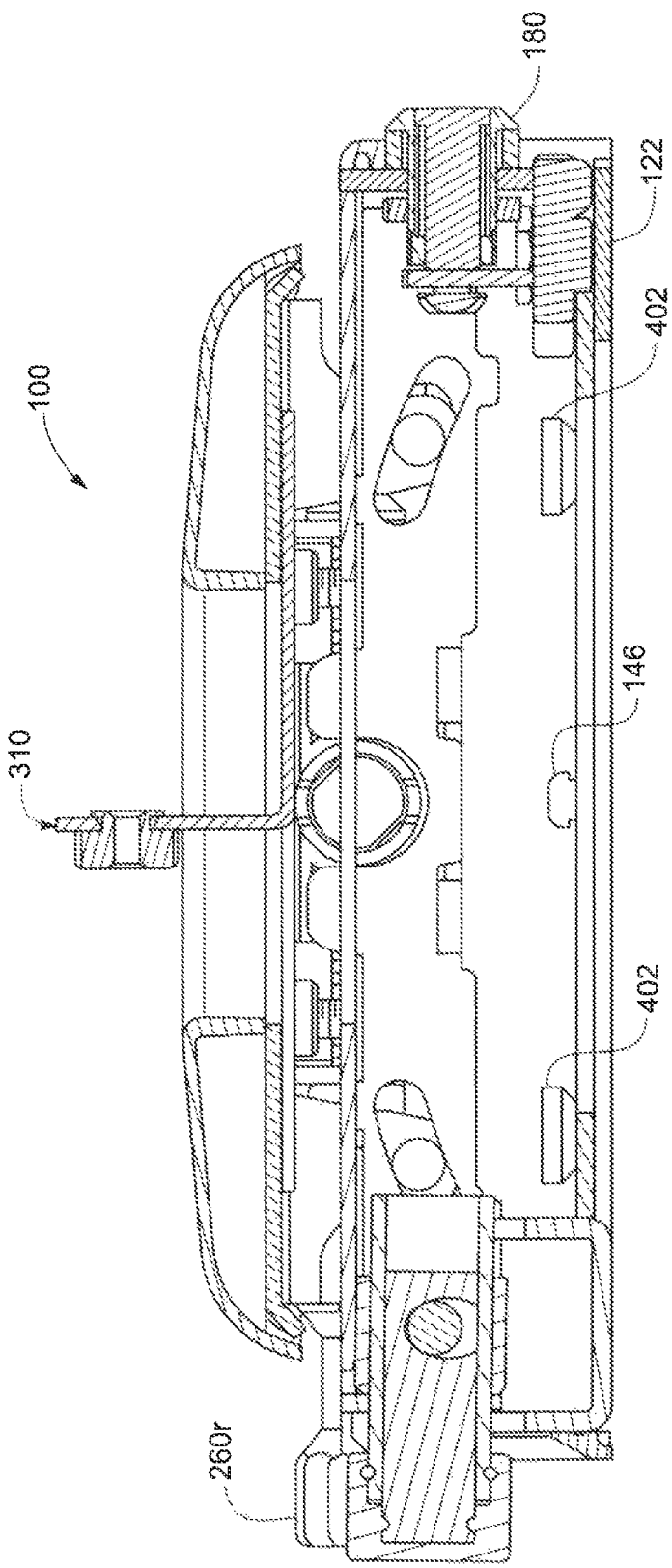

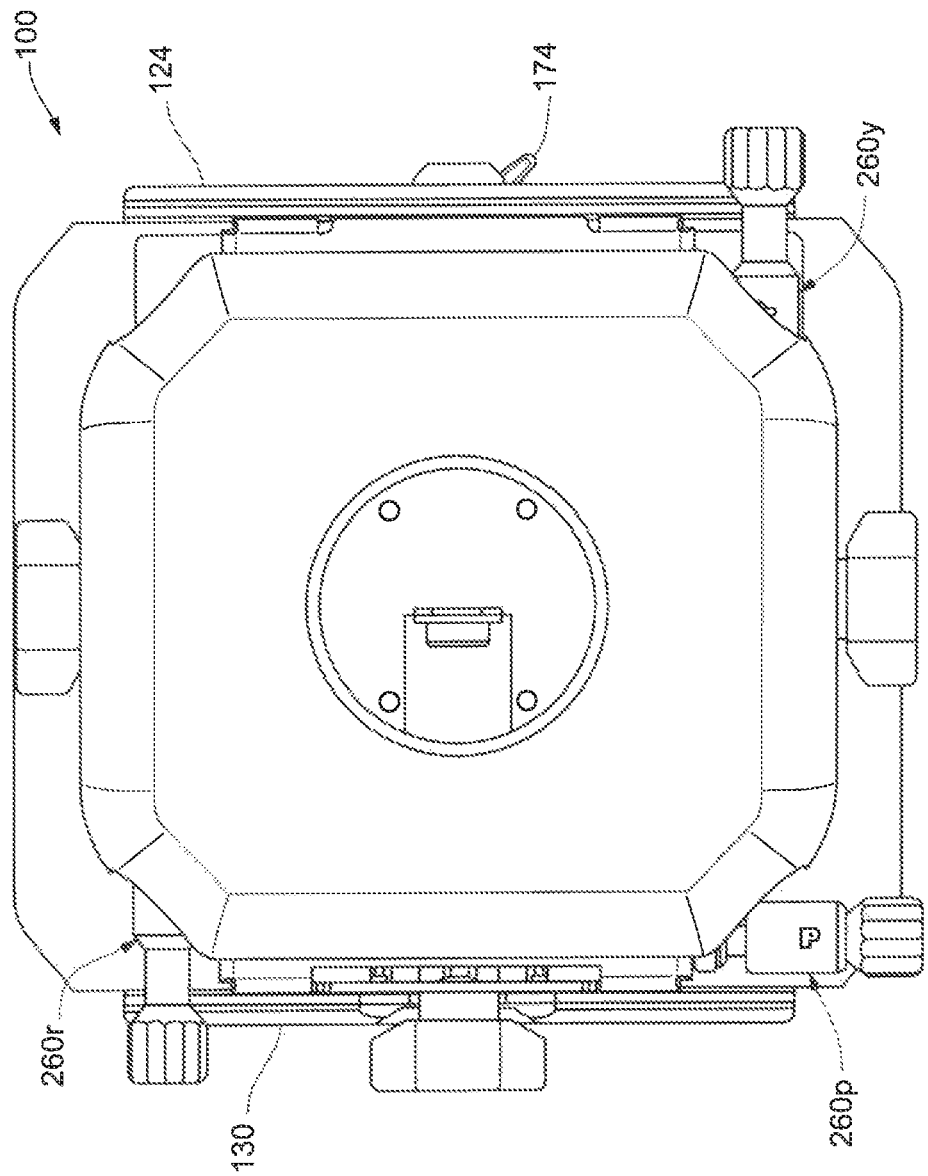

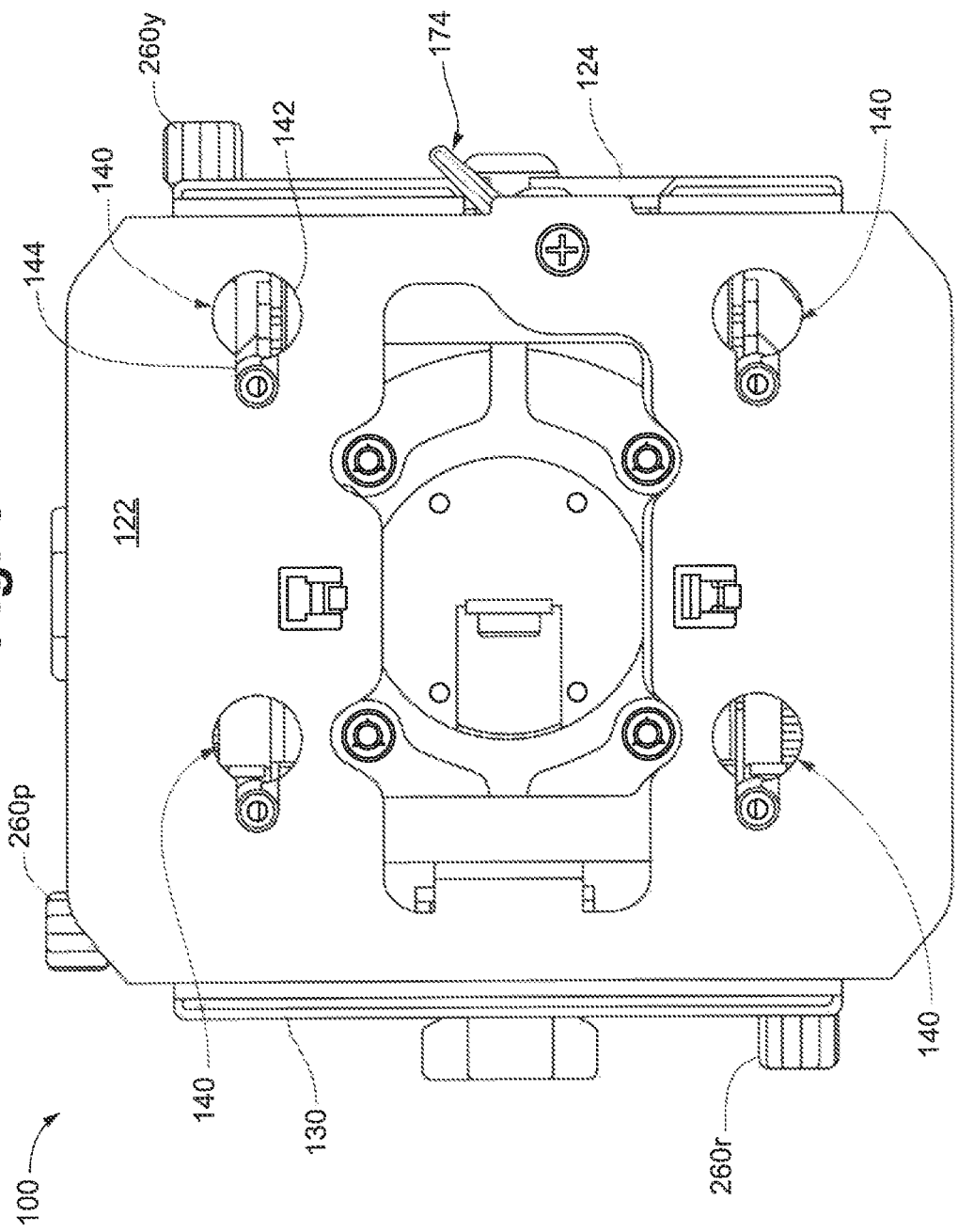

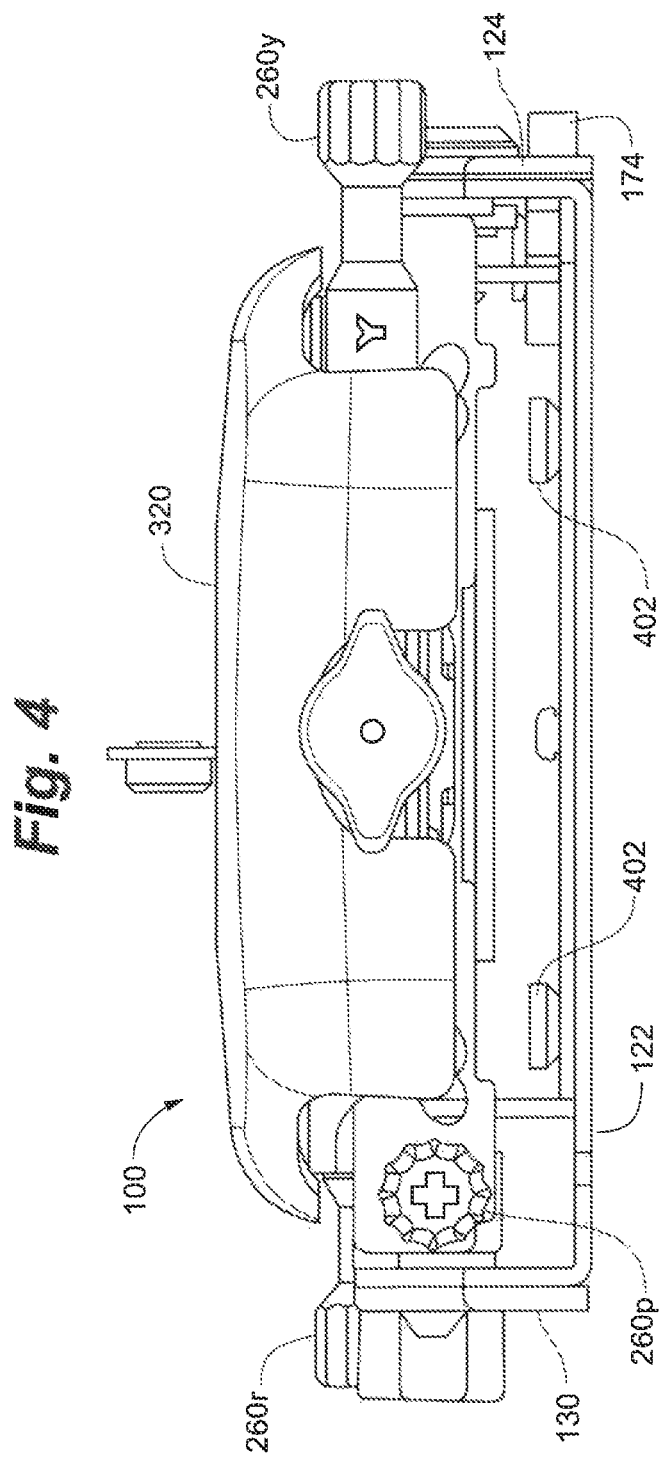

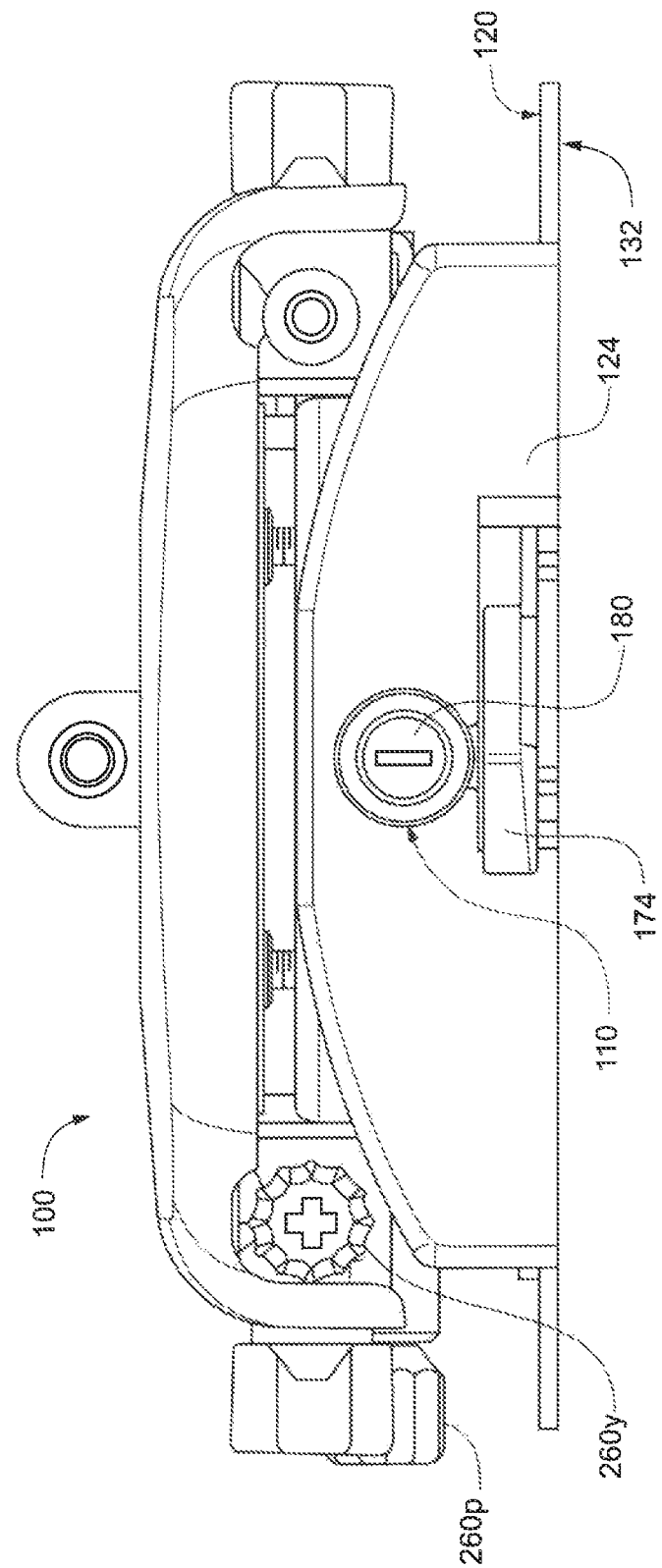

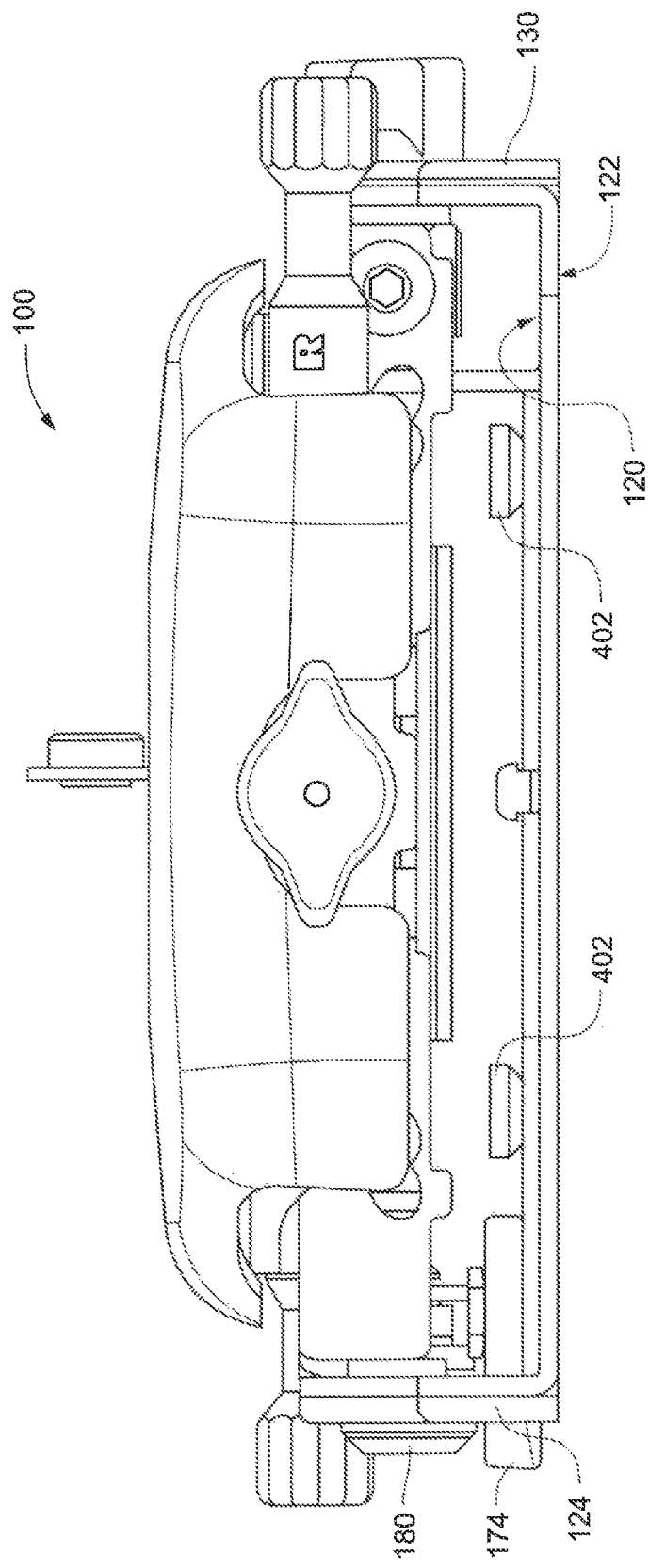

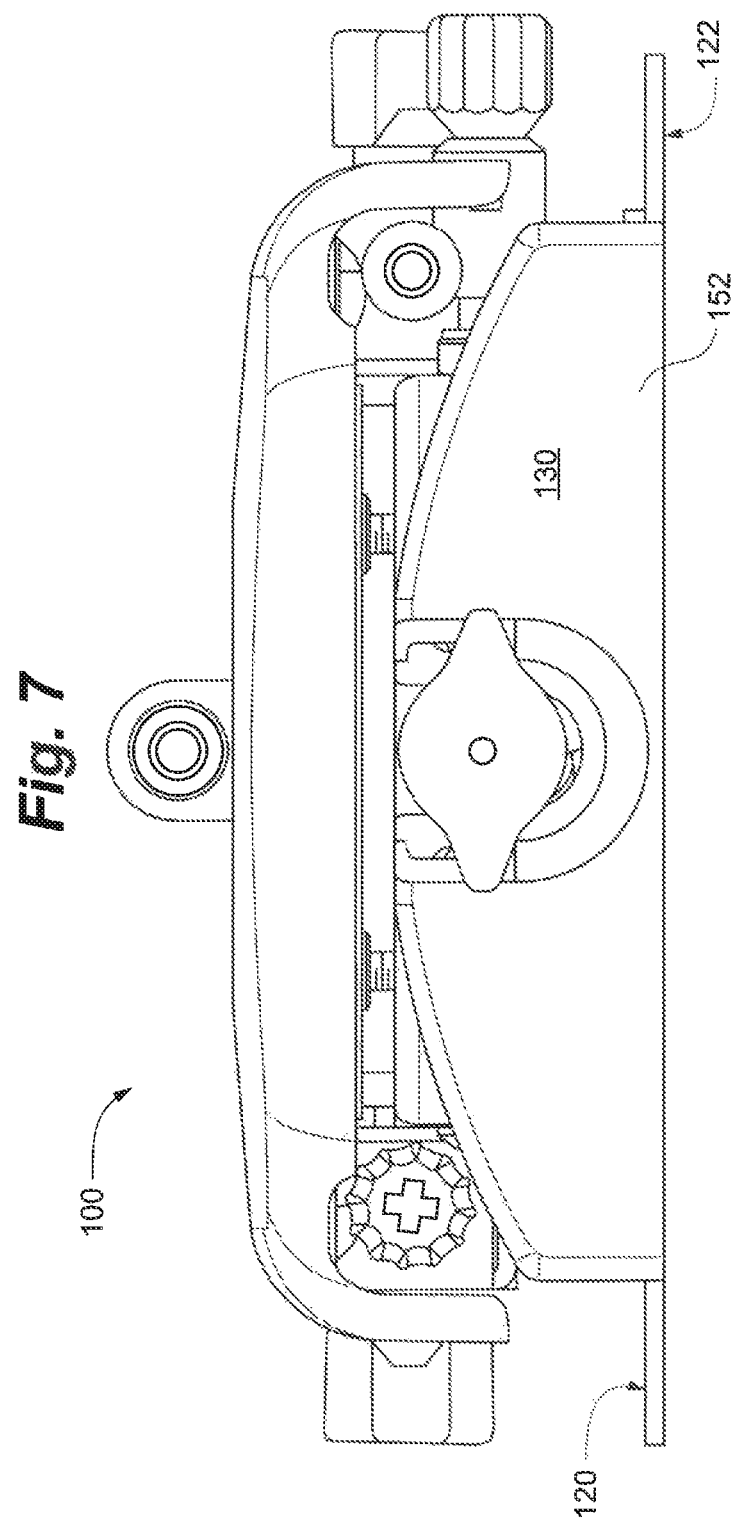

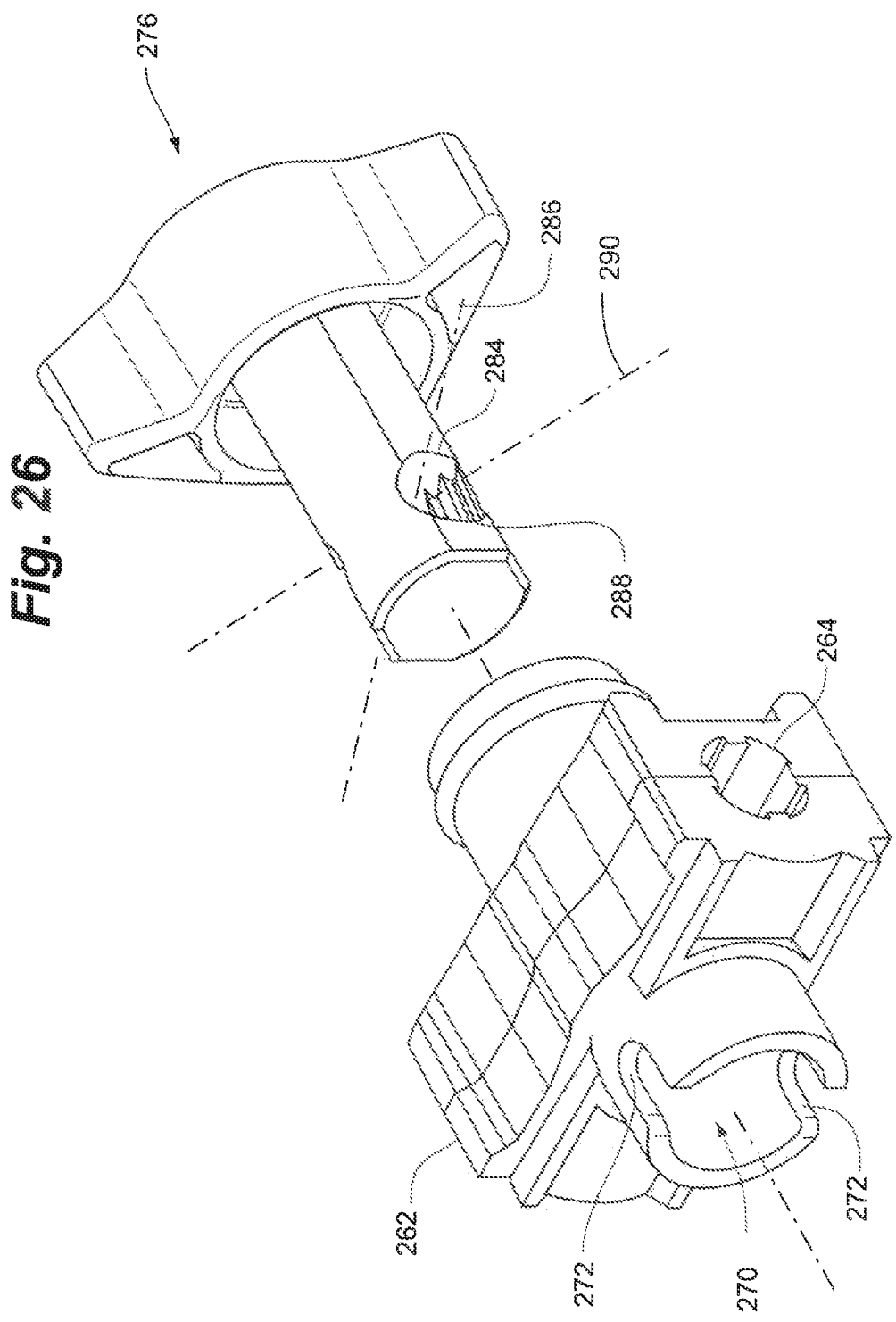

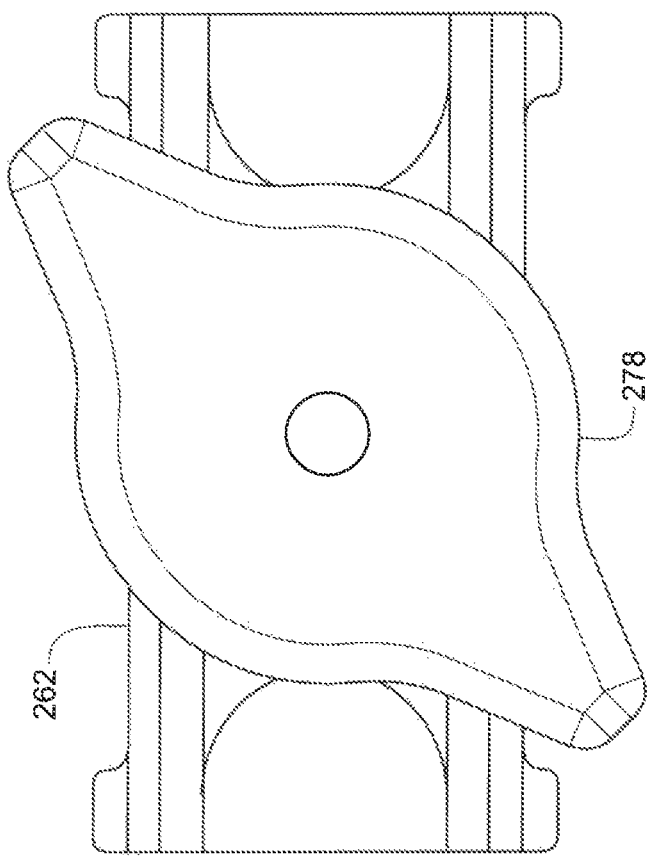

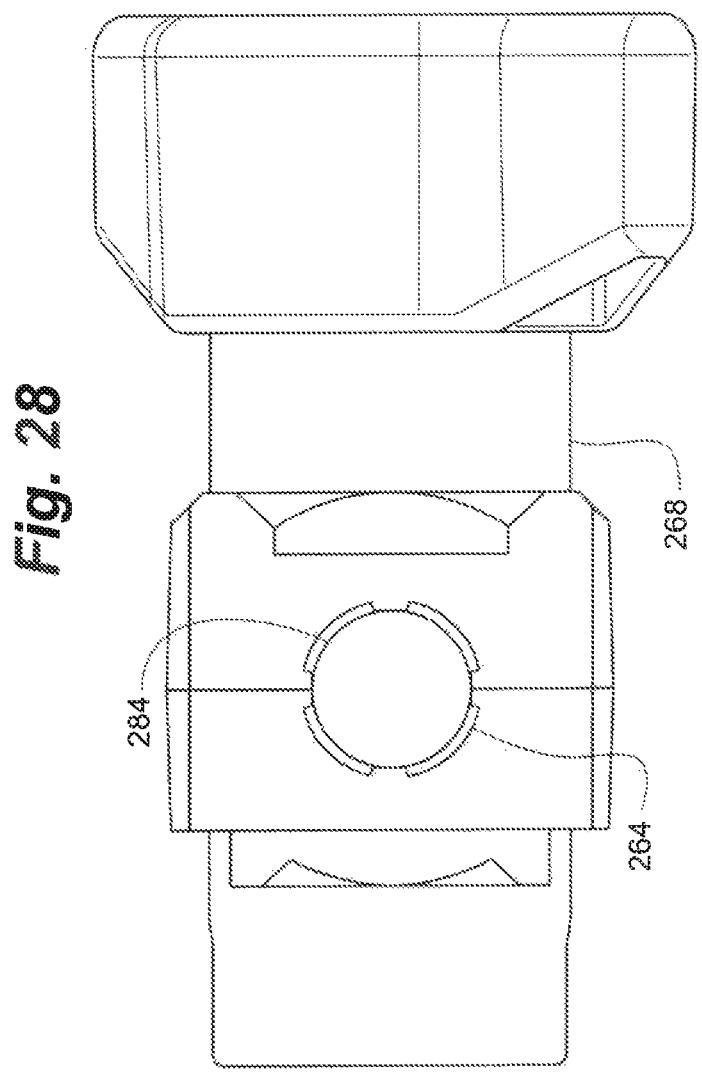

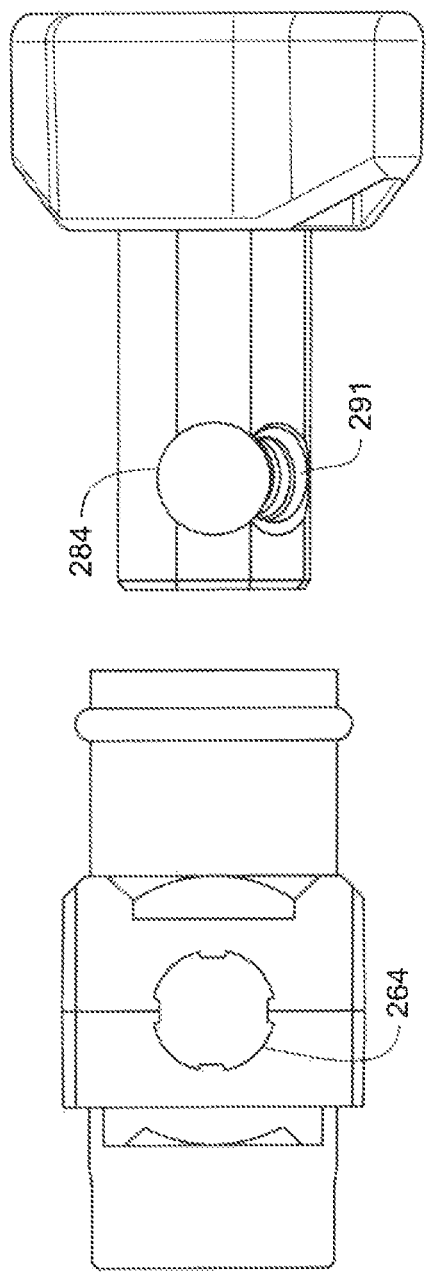

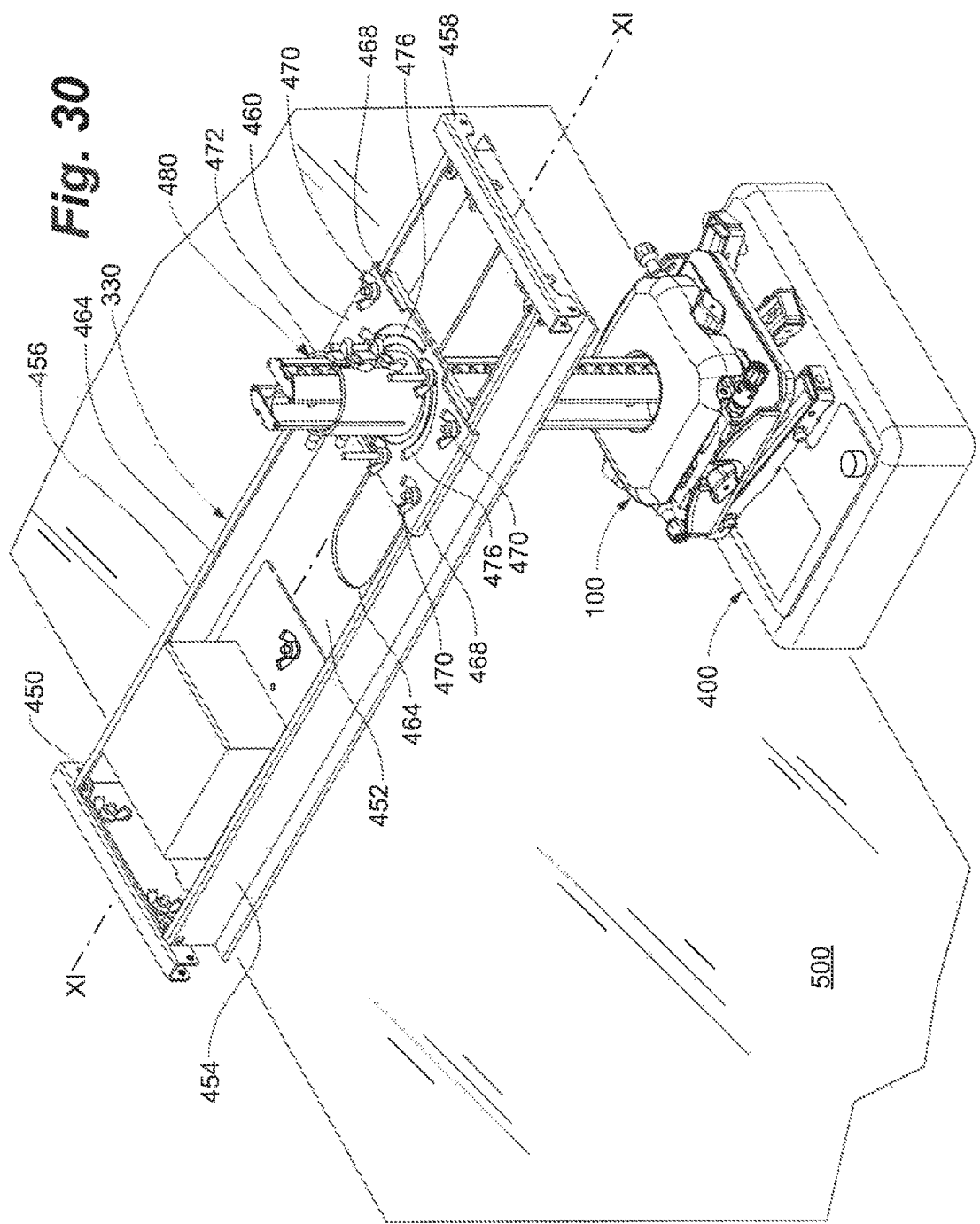

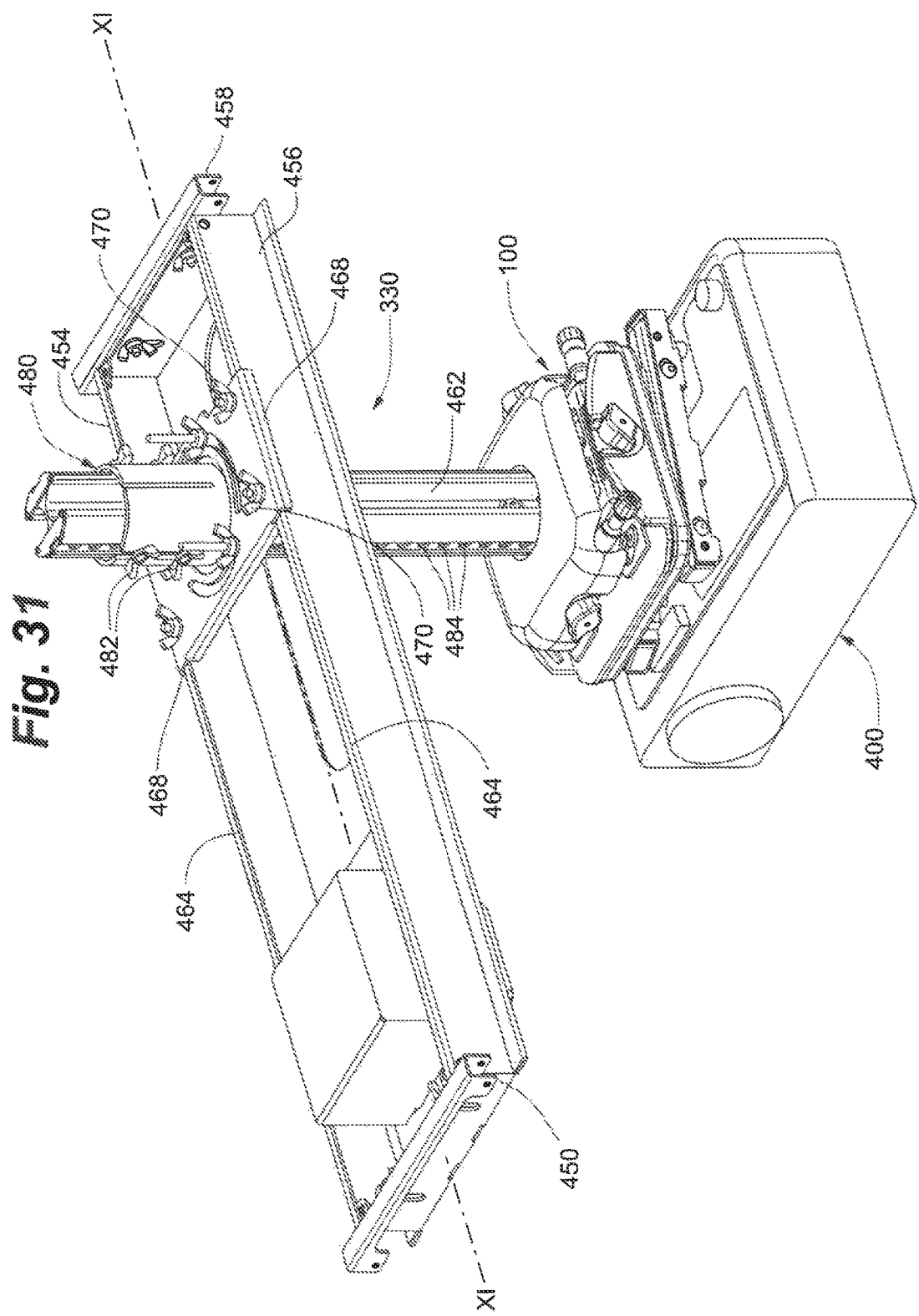

SHORT THROW PROJECTOR MOUNT WITH ADJUSTABLE SCREW DRIVE

RELATED APPLICATION

The present application claims priority to PCT Application No. PCT/US2016/029262, entitled SHORT THROW PROJECTOR MOUNT WITH ADJUSTABLE SCREW DRIVE, filed Apr. 25, 2016, and claims the benefit of U.S. Provisional Application No. 62/151,789, filed Apr. 23, 2015, which are both hereby incorporated herein by reference in their entirety.

FIELD OF THE INVENTION

The present invention relates to mounting devices and more specifically to adjustable mounts for projectors.

BACKGROUND OF THE INVENTION

Multi-media presentations performed with video projection equipment have become very common for business and entertainment purposes. Often, the video projection equipment is a portable LCD projector that is placed on a table, cart, or stand in the room, with the image projected on a portion of the wall or a portable screen. Such impromptu arrangements, however, have a number of drawbacks. First, a considerable amount of time is often needed to position, aim, and focus the projector in advance of the presentation—time that is expended repeatedly whenever a different projector is set up. Further, it is often difficult to position a portable projector where it is not in the way of persons moving about in the room, or in the line of sight for those viewing the presentation. Moreover, the wires and cables used to connect the projector with the computer are in the open at ground level, presenting a tripping hazard and an opportunity for damage to the projector if someone comes in contact with them.

In view of these many drawbacks of portable projectors, mounting devices have been developed to enable mounting of a projection device from the ceiling or wall of a presentation room. Such devices have generally been successful in alleviating some of the problems associated with a projector at ground level having exposed wires. These prior ceiling or wall mounting devices have presented certain drawbacks, however.

In U.S. Pat. No. 5,490,655, a device for mounting a video/data projector from a ceiling or wall is disclosed in which struts are used to form channels for supporting the projector and to conceal cabling. The channels, however, result in a rather bulky device that may be difficult to harmonize with the aesthetic environment of a presentation room. In addition, adjustment of the projector for roll, pitch, and yaw may be time consuming and difficult due to the generally limited adjustment capability of the device. Also, the projector may be vulnerable to theft by anyone with common hand tools and access to the device during unattended hours. Other prior devices such as the low-profile LCD projector mount is disclosed in U.S. Pat. No. 6,042,068, offer a relatively more compact mount arrangement, but still offer only a limited range of projector pitch and yaw adjustment, and no roll adjustment at all.

A projector mount is described in U.S. Pat. No. 7,156,359 (owned by the owners of the present invention and hereby fully incorporated by reference) which alleviates many of the problems of prior devices. The disclosed mount provides independent projector roll, pitch, and yaw adjustments along with theft deterrence in the form of coded fasteners connecting each separate portion of the mount. Fine adjustment for position may be hampered, however, due to the number of separate fasteners to be loosened and tightened to enable adjustment (six for the pitch and roll adjustments), and by the tendency for the weight of the projector to pull the mount out of adjustment unless the projector is held in the desired position. Also, although the theft resistant security fasteners inhibit theft of the device, convenience of use of the projector device is compromised by the need to remove the security fasteners with a special tool in order to move the projector to a new location.

In U.S. Pat. No. 7,497,412, (owned by the owners of the present invention and hereby fully incorporated by reference), a projector mount is disclosed for attaching a projection device to an overhead structure which includes a device interface operably attachable to the projection device with a plurality of fasteners. The device interface has a first portion and a second portion slidably disposed on the first portion. The first and second portions together define a plurality of retaining structures, each retaining structure for receiving a separate one of the plurality of fasteners. The second portion is selectively slidably shiftable relative to the first portion between a first latched position wherein each of the plurality of fasteners is received and retained in a separate one of the retaining structures and a second unlatched position wherein the plurality of fasteners is freely disengagable from the retaining structures.

A need still exists in the industry for a projector mount combining the features of relatively quick and easy precision projector position adjustment in roll, pitch, and yaw, orientations, high security and theft deterrence, and compact size.

SUMMARY OF THE INVENTION

Embodiments of the present invention meet the need in the industry for a projector mount combining the features of relatively quick and easy precision projector position adjustment in roll, pitch, and yaw, orientations, high security and theft deterrence, and compact size.

In particular, embodiments of the present invention provide a mount with controls enabling quick selection between course alignment of a projector by hand about any of the three positioning axes—pitch, yaw, and roll—and precision adjustment of projector position about any one or more of the axes, once the course alignment has been made. Hence, embodiments of the present invention save time, and cost, in the installation of projectors.

In an embodiment, a mount for a projector includes a support structure interface and a projector interface, the projector interface and the support structure interface coupled by an adjustment mechanism including at least a pitch adjustment assembly, and a roll adjustment assembly. At least one of the pitch adjustment assembly or the roll adjustment assembly may include a control mechanism, the control mechanism enabling selection between a first mode in which the projector is positionable about a rotation axis by hand, and a second mode in which the projector is positionable about the rotation axis using the pitch adjustment assembly or the roll adjustment assembly. The pitch adjustment assembly or the roll adjustment assembly may include a rotatable lead screw, and the projector is positioned about the rotation axis in the second mode by rotating the lead screw.

In embodiments, the control mechanism includes a rotatable knob, and rotation of the rotatable knob shifts the control mechanism between the first mode and the second mode.

In further embodiments, the projector interface further includes a yaw adjustment assembly. The yaw adjustment assembly can include a control mechanism, the control mechanism enabling selection between a first mode in which the projector is positionable about the yaw axis by hand, and a second mode in which the projector is positionable about the yaw axis using the yaw adjustment assembly. In embodiments, the yaw adjustment assembly includes a rotatable lead screw, and the projector is positioned about the yaw axis in the second mode by rotating the lead screw. The control mechanism of the yaw mechanism can include a rotatable knob, wherein rotation of the rotatable knob shifts the control mechanism between the first mode and the second mode.

In further embodiments, the mount includes a support structure assembly operably coupled to the support structure interface. The support structure assembly can include an arm assembly, the support structure interface being selectively positionable along the arm assembly to adjust a distance of the projector from a screen. The support structure interface may be operably coupled to the support structure assembly with a column so as to enable selective vertical shifting of the support structure interface relative to the support structure assembly.

In embodiments, a projection system includes a projector; and a mount for attaching the projector to a structure, the mount including a support structure interface, and a projector interface, the projector interface and the support structure interface coupled by an adjustment mechanism including at least a pitch adjustment assembly, and a roll adjustment assembly. At least one of the pitch adjustment assembly or the roll adjustment assembly includes a control mechanism, the control mechanism enabling selection between a first mode in which the projector is positionable about a rotation axis by hand, and a second mode in which the projector is positionable about the rotation axis using the pitch adjustment assembly or the roll adjustment assembly. According to the system, the pitch adjustment assembly or the roll adjustment assembly may include a rotatable lead screw, wherein the projector is positioned about the rotation axis in the second mode by rotating the lead screw. The control mechanism may include a rotatable knob, wherein rotation of the rotatable knob shifts the control mechanism between the first mode and the second mode.

The system may further include a yaw adjustment assembly. The yaw adjustment assembly may further include a control mechanism, the control mechanism enabling selection between a first mode in which the projector is positionable about the yaw axis by hand, and a second mode in which the projector is positionable about the yaw axis using the yaw adjustment assembly. The yaw adjustment assembly may include a rotatable lead screw, with the projector being positioned about the yaw axis in the second mode by rotating the lead screw. The control mechanism of the yaw mechanism can include a rotatable knob, wherein rotation of the rotatable knob shifts the control mechanism between the first mode and the second mode.

In an embodiment, a mount for a projector includes a support structure interface and a projector interface, the projector interface and the support structure interface coupled by an adjustment mechanism including at least one adjustment assembly for adjusting the projector about at least one rotation axis, the adjustment assembly including a control mechanism, the control mechanism enabling selection between a first mode in which the projector is positionable about the at least one rotation axis by hand, and a second mode in which the projector is positionable about the at least one rotation axis using the adjustment assembly.

BRIEF DESCRIPTION OF THE DRAWINGS

The invention may be more completely understood in consideration of the following detailed description of various embodiments of the invention in connection with the accompanying drawings, in which:

FIG. 1A is an isometric cross-section view taken at section A-A of FIG. 1;

FIG. 1B is a right elevation view of FIG. 1A;

FIG. 1C is an isometric cross-section view taken at section C-C of FIG. 1;

FIG. 1D is a front elevation view of FIG. 1C;

FIG. 2 is a top plan view of the mount of FIG. 1;

FIG. 3 is a bottom plan view of the mount of FIG. 1;

FIG. 4 is a front elevation view of the mount of FIG. 1;

FIG. 5 is a right elevation view of the mount of FIG. 1;

FIG. 6 is a rear elevation view of the mount of FIG. 1;

FIG. 7 is a left elevation view of the mount of FIG. 1;

FIG. 26 is an isometric exploded view of portions of a device orientation adjustment assembly with the adjustment selector depicted in an alternate position;

FIG. 27 is a rear elevation view of FIG. 26;

FIG. 28 is a right elevation view of the portions of FIG. 26 assembled together;

FIG. 29 is a right elevation view of FIG. 26;

FIG. 30 is an isometric view of a projector secured to a projector mount and support structure assembly, according to an embodiment of the invention; and FIG. 31 is another isometric view of FIG. 30;

Figure 1:
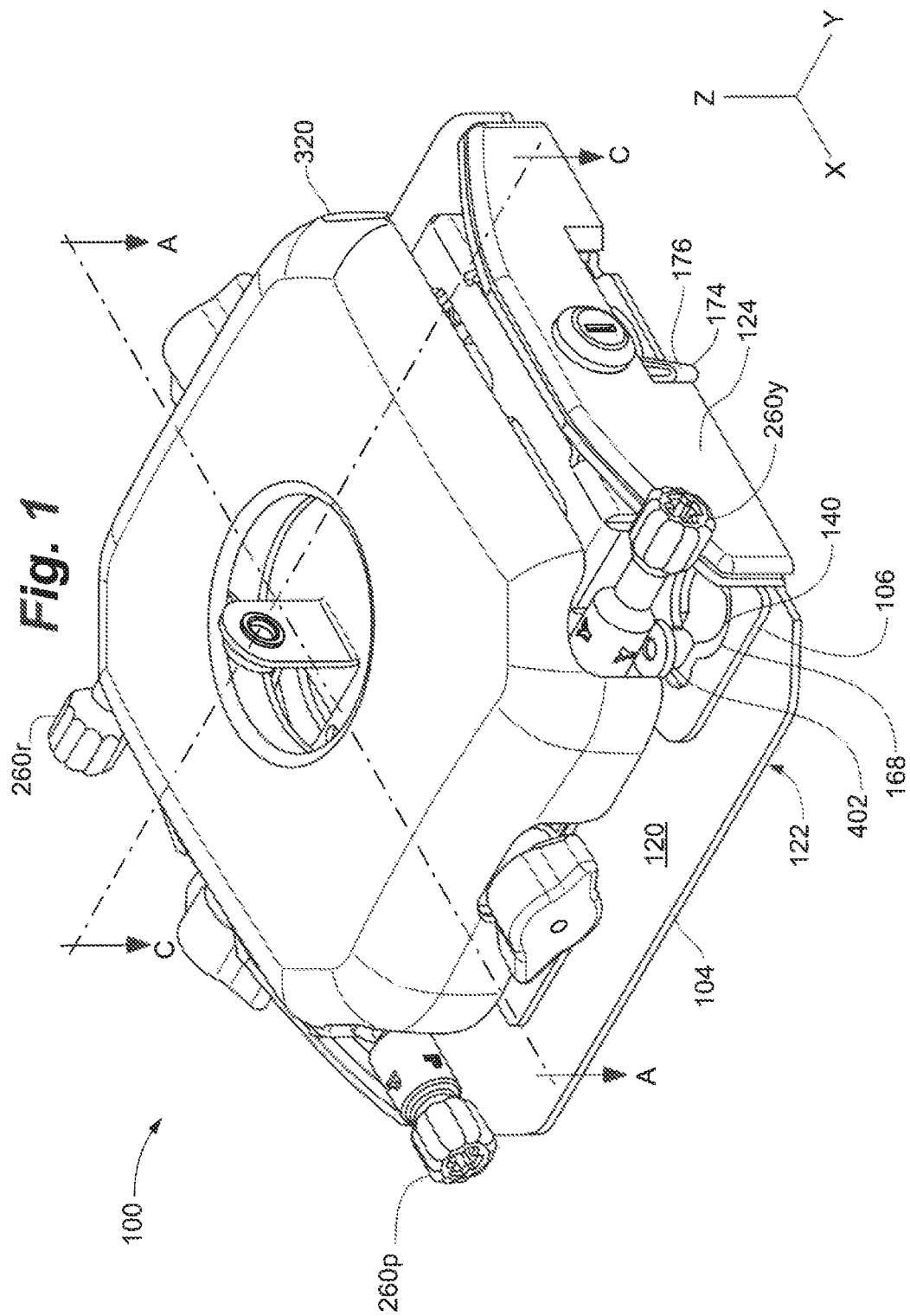
FIG. 1 is an isometric view of a projector mount according to an embodiment of the invention.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION OF THE DRAWINGS

The following detailed description should be read with reference to the drawings in which similar elements in different drawings are numbered the same. The drawings, which are not necessarily to scale, depict illustrative embodiments and are not intended to limit the scope of the invention.

The accompanying Figures depict embodiments of the mount of the present invention, and features and components thereof. Any references to front and back, right and left, top and bottom, upper and lower, and horizontal and vertical are intended for convenience of description, not to limit the present invention or its components to any one positional or spatial orientation. Any dimensions specified in the attached Figures and this specification may vary with a potential design and the intended use of an embodiment of the invention without departing from the scope of the invention.

Moreover, the Figures may designate, for reference purposes, the relative directions of x-y-z coordinate axes as applied to the invention. Any reference herein to movement in an x-axis direction, a y-axis direction, or a z-axis direction, or to rotation about an x-axis, a y-axis or a z-axis, relates to these coordinate axes. The x-axis is oriented fore-and-aft in relation to the mounted device, the z-axis is vertical, and the y-axis is oriented laterally from side-to-side in relation to the mounted device and perpendicular to the x-axis and the z-axis. For the purposes of the present application, roll is defined as angular displacement about the x-axis, pitch is defined as angular displacement about the y-axis, and yaw is defined as angular displacement about the z-axis.

As depicted generally in the Figures, projector mount 100 generally includes a base assembly 102, an intermediate frame 200, an upper frame 240, at least one device orientation adjustment assembly 260, a support structure interface 300 and an optional cover 320. Projector mount 100 may include three device orientation adjustment assemblies, as depicted in the Figures, in the form of yaw adjustment assembly 260y, roll adjustment assembly 260r, and pitch adjustment assembly 260p. In other embodiments not pictured, projector mount 100 may be provided with fewer than three device orientation adjustment assemblies.

Referring now to base assembly 102, as best depicted in FIGS. 1, 3, 8-12, 16 and 19, base assembly 102 generally includes a base plate 104, a locking plate 106, and an optional lock mechanism 110. Base plate 104 includes an upper surface 102, an opposing lower surface 122 configured to be positioned proximate a projector 400, a first upright 124 and a second upright 130, each of the uprights being generally transverse to a plane defined by upper surface 120 and lower surface 122. First upright 124 includes an aperture 126 configured to accommodate a lock 180 of lock mechanism 110, and a plurality of slots 128. Second upright 130 includes a channel 132 configured to provide clearance for a portion of a device orientation adjustment assembly 260, as well as a plurality of slots 134. Each of slots 128, 134 are configured to cooperate with pitch adjustment assembly 260p as described in more detail below.

Base plate 104 further includes a support means 136 for a device orientation adjustment assembly 260, the support means 136 including a channel 138 configured to provide clearance for a portion of the device orientation adjustment assembly. Disposed in base plate 104 are a plurality of keyhole apertures 140, each aperture 140 including an enlarged portion 142 and a channel portion 144. Keyhole apertures 140 are configured to receive button-head fasteners 402 of projector 400.

A plurality of stops 146 are included in base plate 104, extending generally transverse from upper surface 102. Stops 146 are configured to limit movement of locking plate 106, and include a stem portion extending to a flared top portion.

Finally, base assembly 102 may include covers 152 removably coupled with uprights 124, 130 to provide an aesthetically pleasing appearance to base assembly 102 as well as prevent any possible injury to a user while adjusting projector mount 100 by covering arcuate slots 128, 134.

Referring now to locking plate 106, as best depicted in FIGS. 8-12, 16 and 19, locking plate 106 generally includes an upper surface 160, a lower surface 162, a notch 164, and a channel 166. Further included in locking plate 106 is a plurality of keyhole apertures 168, each aperture 168 including an enlarged portion 170 and a channel portion 172.

Locking plate 106 is movable between an unlocked position and a locked position. In the unlocked position, apertures 168 of locking plate 106 are aligned with apertures 140 of base plate 104 such that fasteners 402 of projector 400 can be accepted by projector mount 100. In the locked position, locking plate 106 is translated with respect to base plate 104 such that fasteners 402 of projector 400 are secured between channel portion 144 of base plate 104 and channel portion 172 of locking plate 172, such as depicted in FIGS. 1, 11-12, 16 and 19.

A control lever 174, which includes a lever portion 176 and a flange portion, is provided to operably move locking plate 106 between the unlocked position and the locked position. Control lever 174 is rotatably coupled to base plate 104 in an off-center arrangement. Flange portion of control lever 174 is configured to engage aperture 166 of locking plate 166, such that operation of control lever 174 causes locking plate 106 to be moved between the unlocked position and the locked position.

Lock mechanism 110 includes a lock portion 180 configured to be coupled to aperture 126 of first upright 124 of base plate 104, and a lock arm 182 actuated by lock 180. Lock 180 may be configured to be operable by a unique key, a screwdriver, or other suitable means. Lock arm 182 is selectively engageable with control lever 174 and channel 166 of locking plate 106 so as to maintain locking plate 106 in the locked position and engaged with fasteners 402 of projector 400, as depicted in FIGS. 17 and 18.

Figure 8:
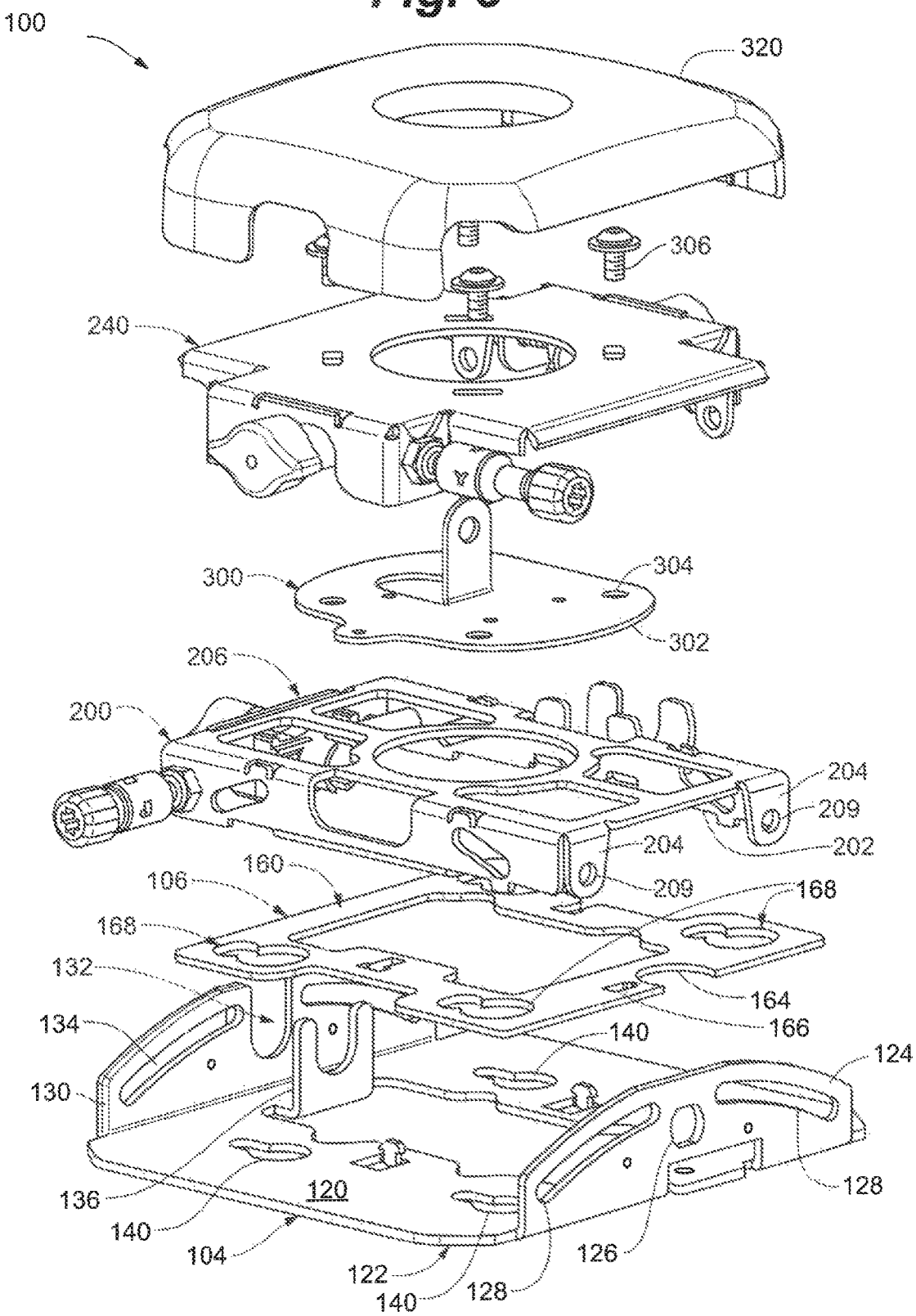
FIG. 8 is an isometric exploded view of the mount of FIG. 1, with select elements removed for clarity.
Figure 9:
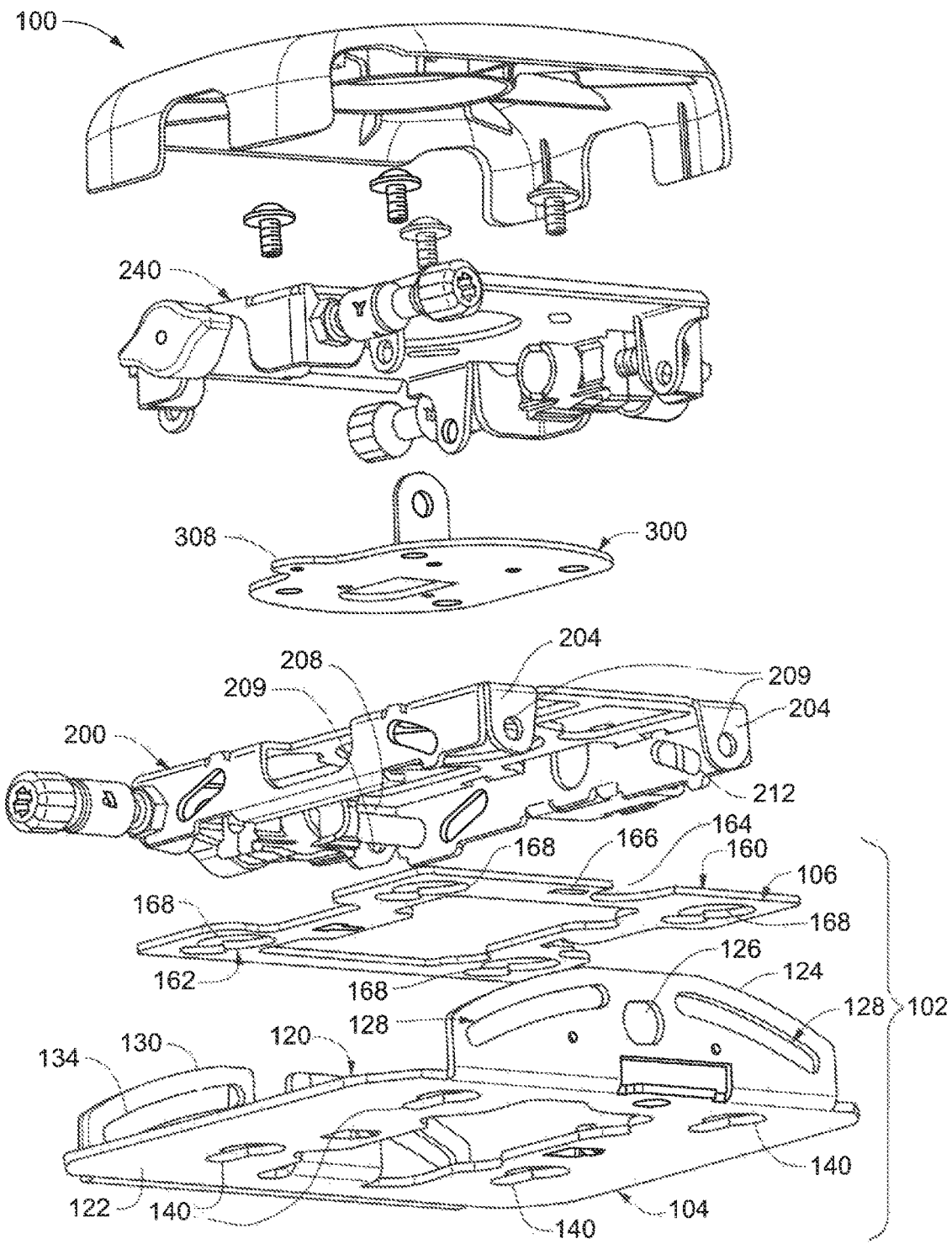
FIG. 9 is another view of FIG. 8.
Figure 10:
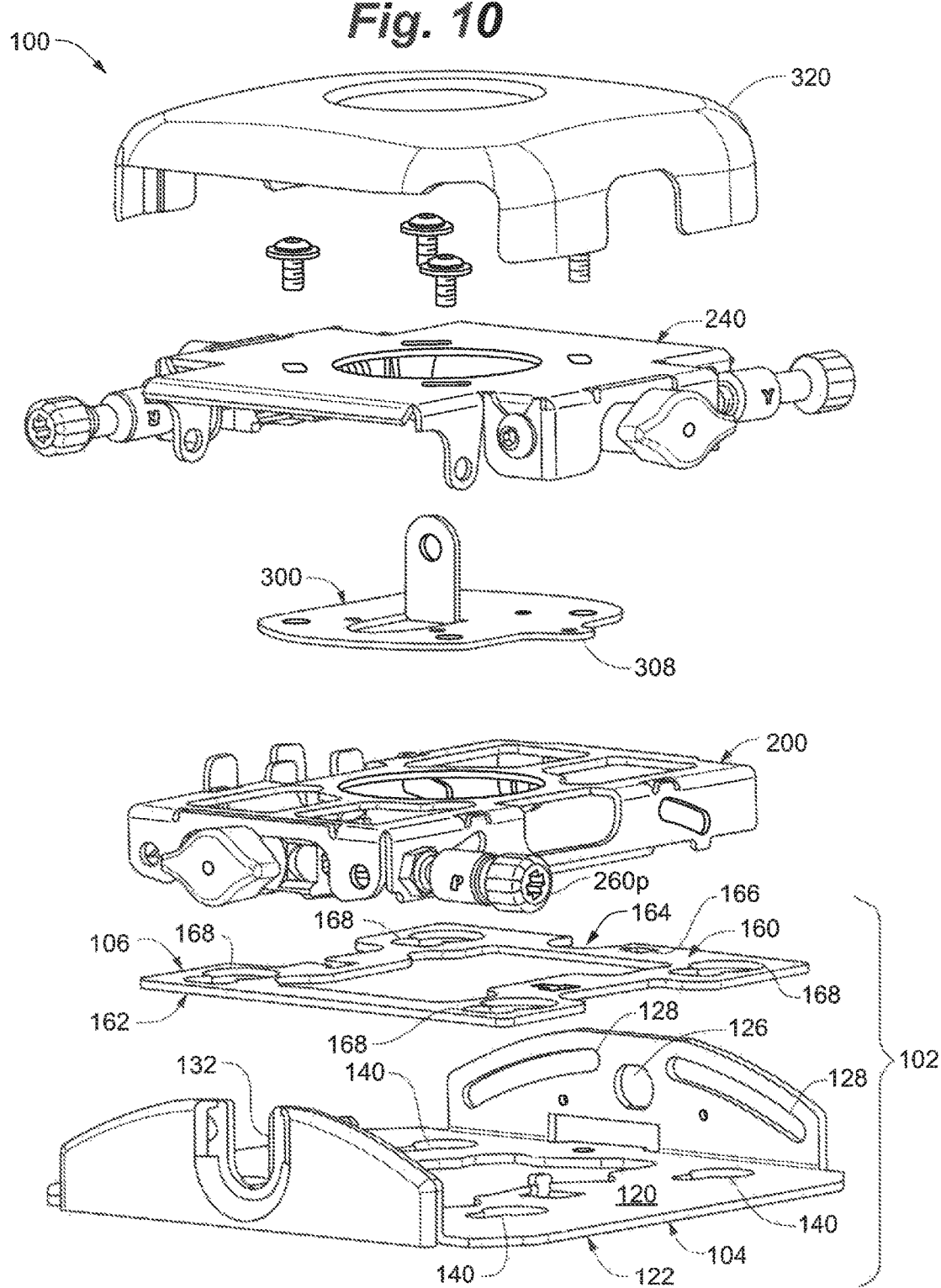
FIG. 10 is another view of FIG. 8.
Figure 11:
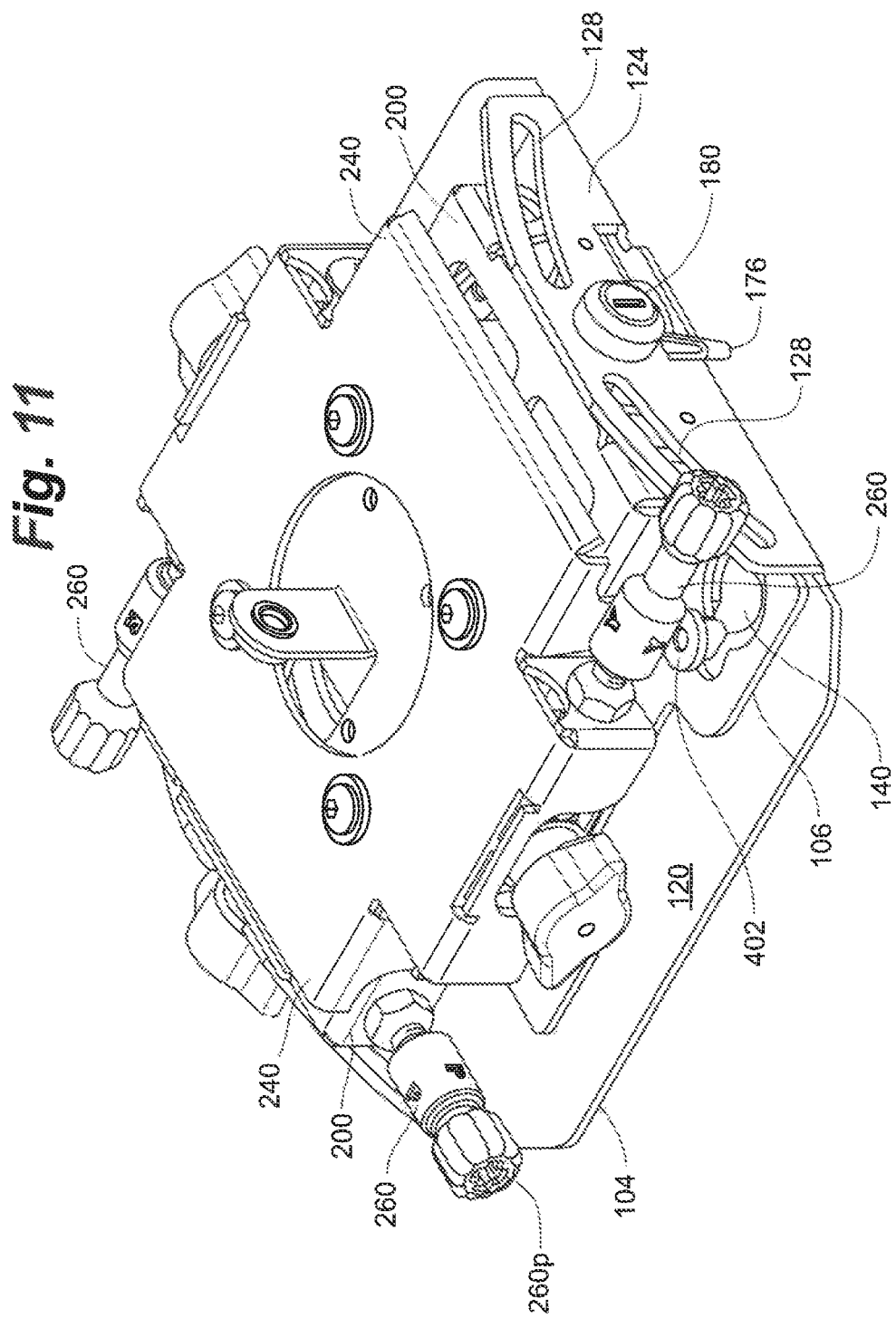
FIG. 11 is an isometric view of the projector mount of FIG. 1, depicted with the top cover and side covers removed.
Figure 12:
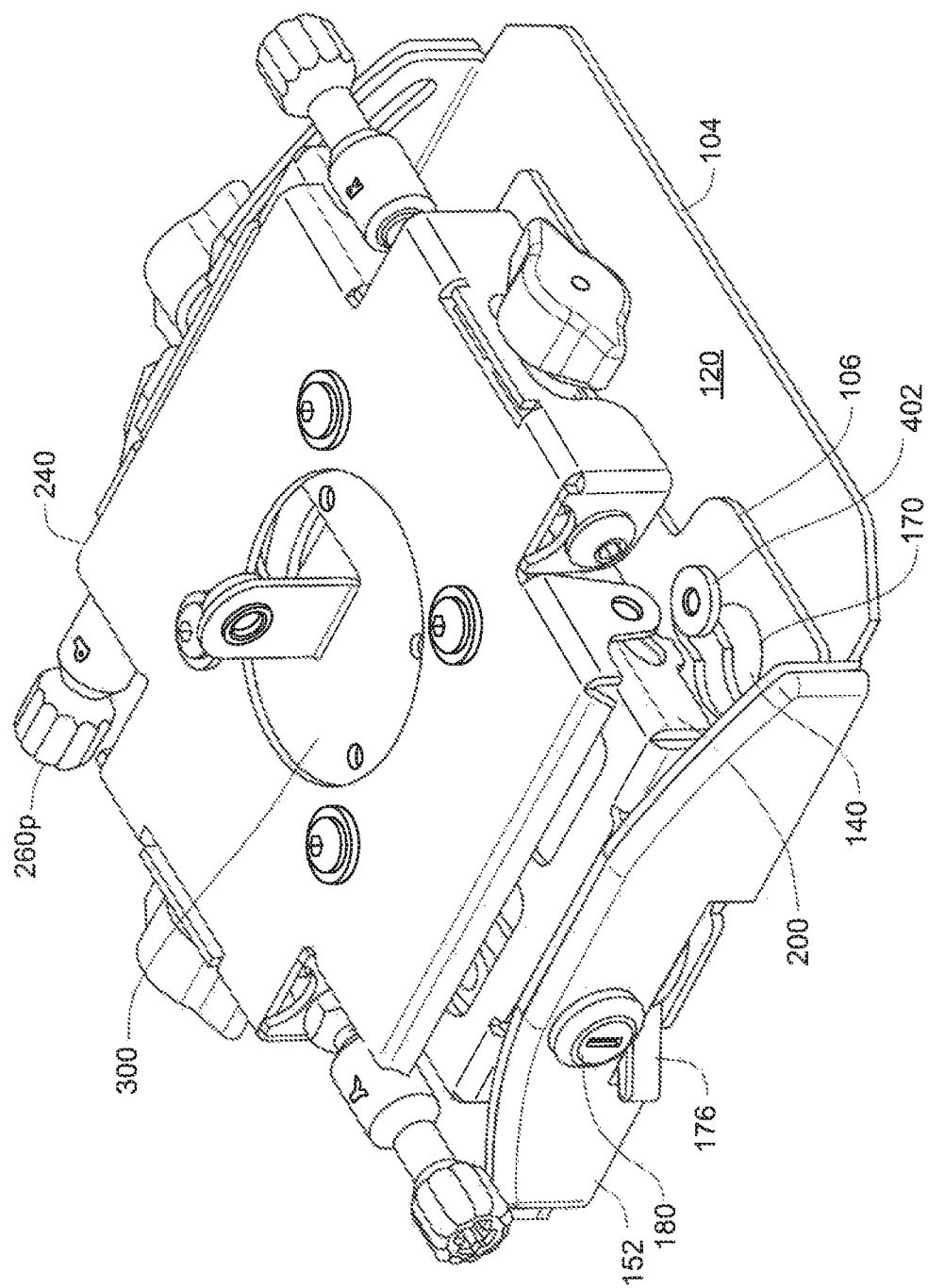
FIG. 12 is another view of FIG. 11.
Figure 13:
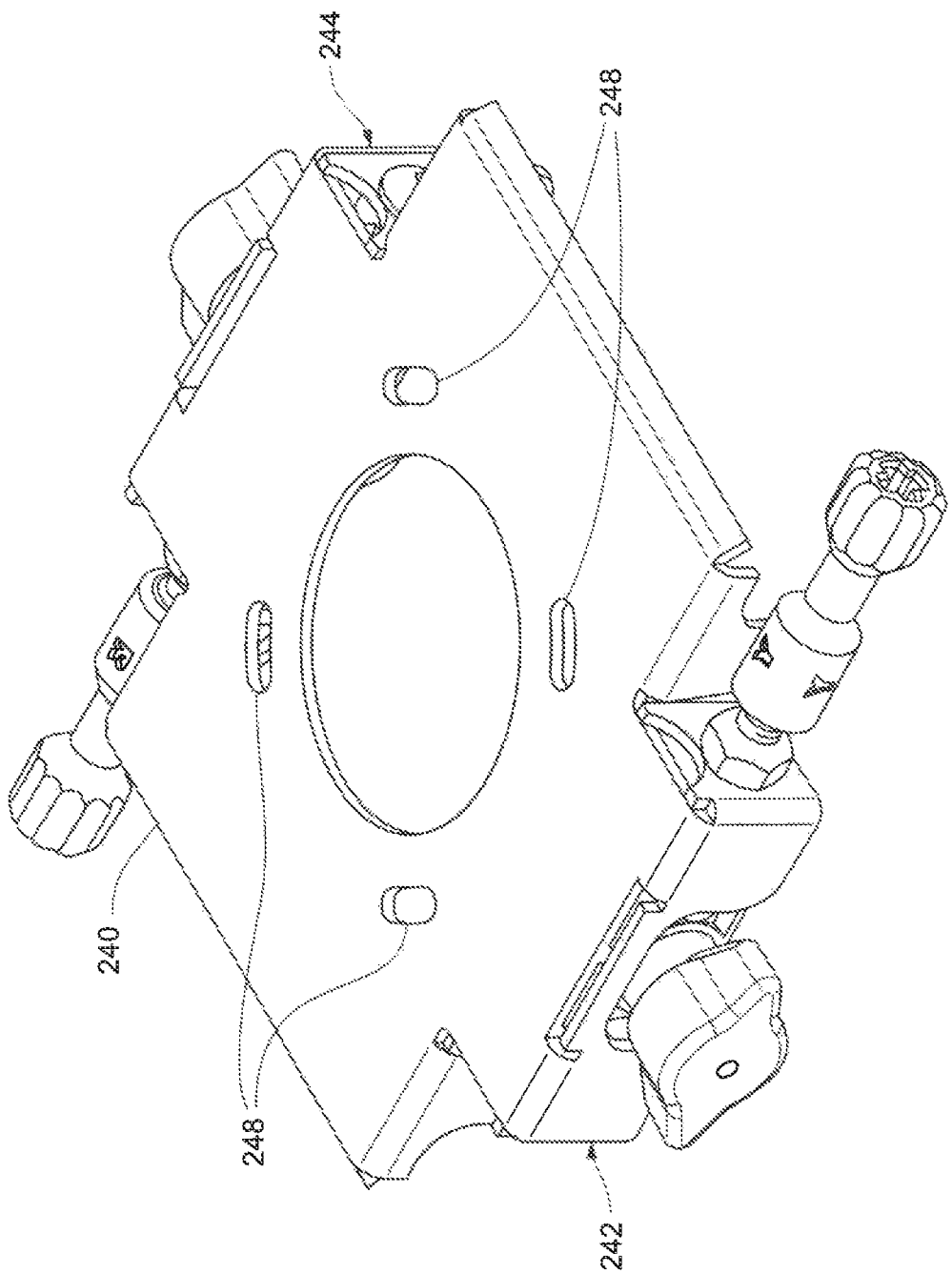
FIG. 13 is an isometric view of an upper frame of a projector mount, depicted with device orientation adjustment assemblies.
Figure 14:
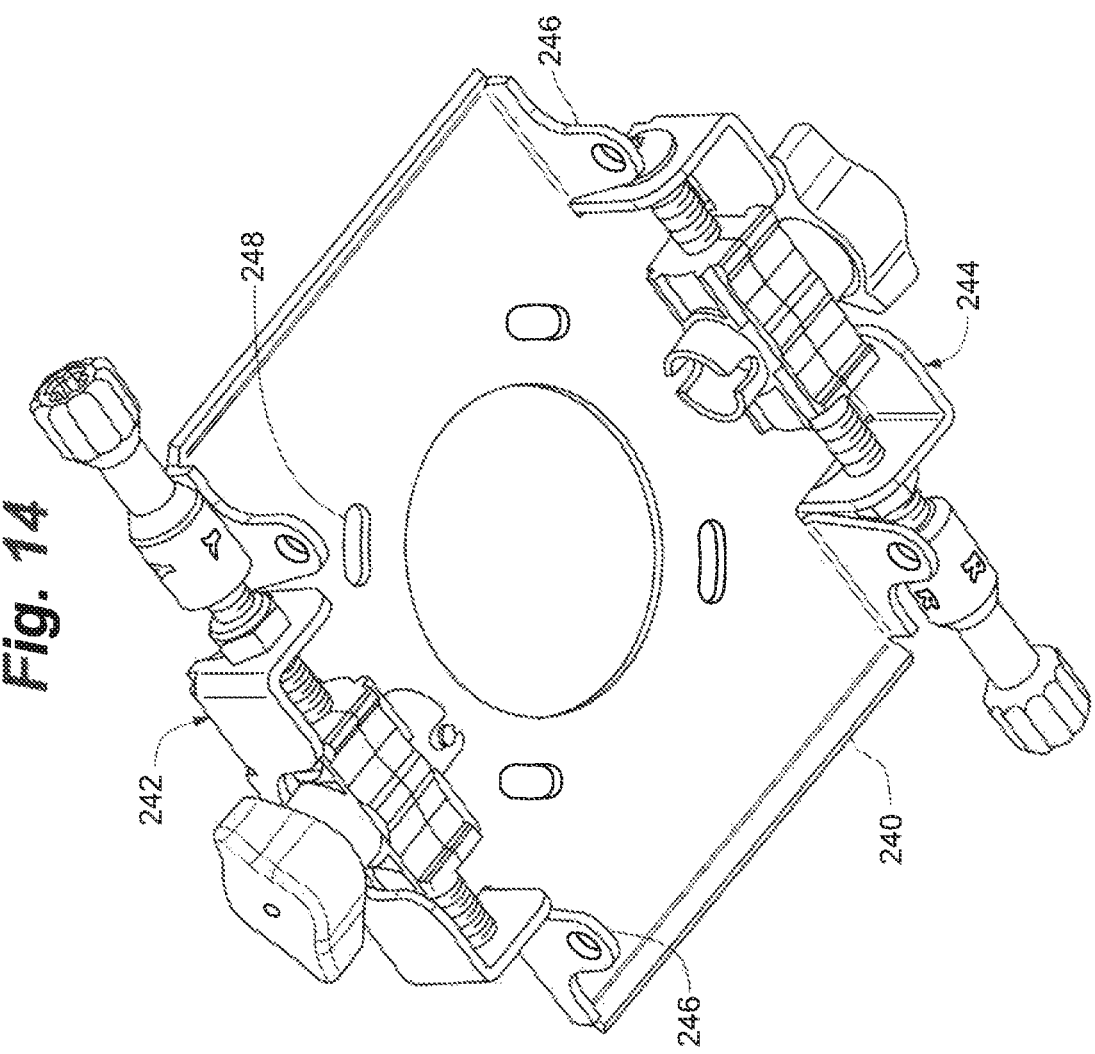
FIG. 14 is another view of FIG. 13.
Figure 15:
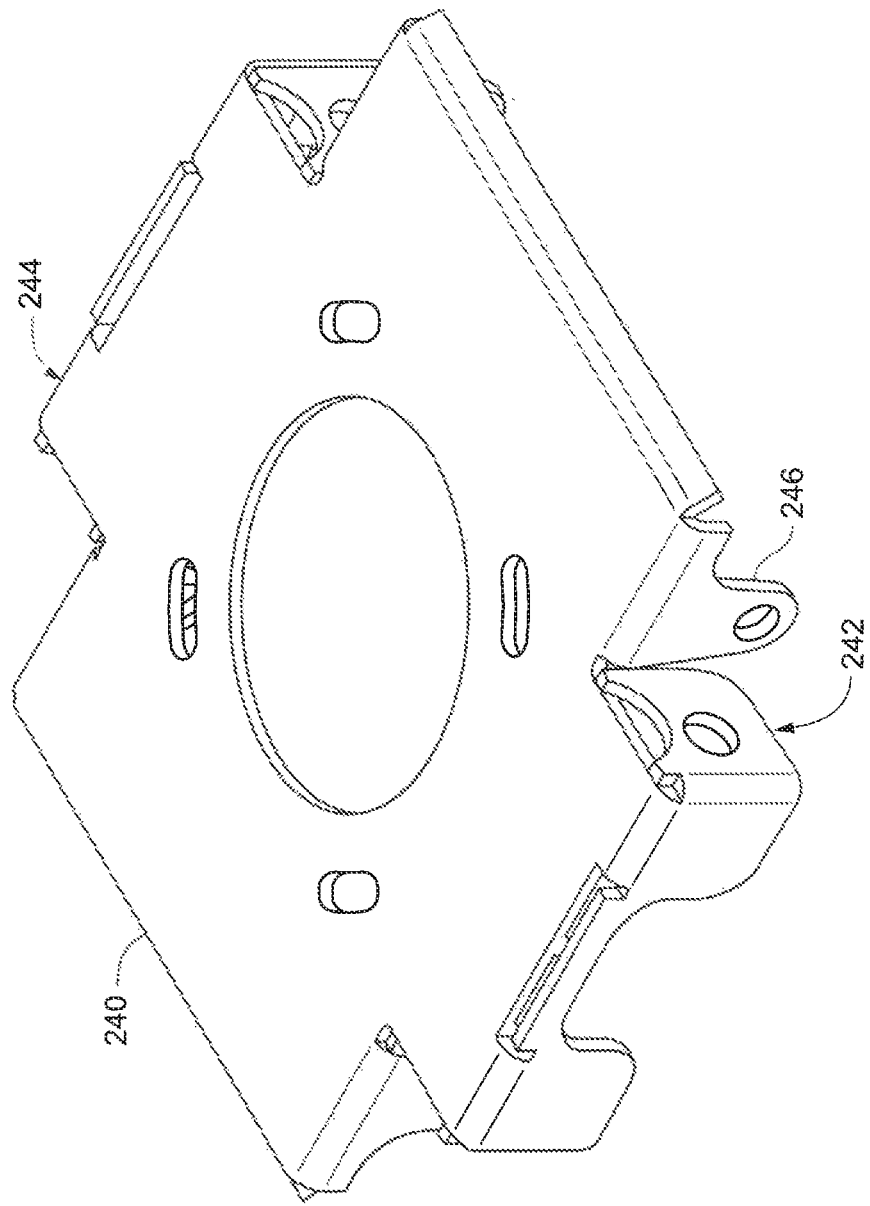
FIG. 15 is an isometric view of an upper frame of a projector mount.

Referring now to FIGS. 8-10, intermediate frame 200 includes a first side 202, a second side 206, a third side 210 and a fourth side 218. Each of first side 202 and second side 206 include respective tabs 204, 208 having bores 209 defined therein which facilitate adjustably coupling intermediate frame 200 to base plate 104 by way of slots 128, 134 defined in uprights 124, 130, respectively, to provide pitch adjustment of projector mount 100. Suitable fasteners for coupling intermediate frame 200 to base plate 104 may include bolts, screws, rivets, or similar structures extending through bores 209 and slots 128, 134 which enable intermediate frame 200 to be adjustably positioned with respect to base plate 104.

The third side 210 of intermediate frame 200 includes a plurality of slots 212 defined therein, and support means 214, 215 configured to receive roll adjustment assembly 260r, each of support means 214, 215 including respective channels 216, 217 configured to provide clearance for a portion of roll adjustment assembly 260r. The fourth side 218 of intermediate frame 200 includes a plurality of slots 220 disposed therein, each of slots 212, 220 being configured to cooperate with roll adjustment assembly 260r as described in more detail below. Intermediate frame 200 further includes pitch adjustment receiving means 222, in the form of bores 224 disposed in each of third side 210 and fourth side 218, configured to receive a portion of pitch adjustment assembly 260p.

Figure 16:
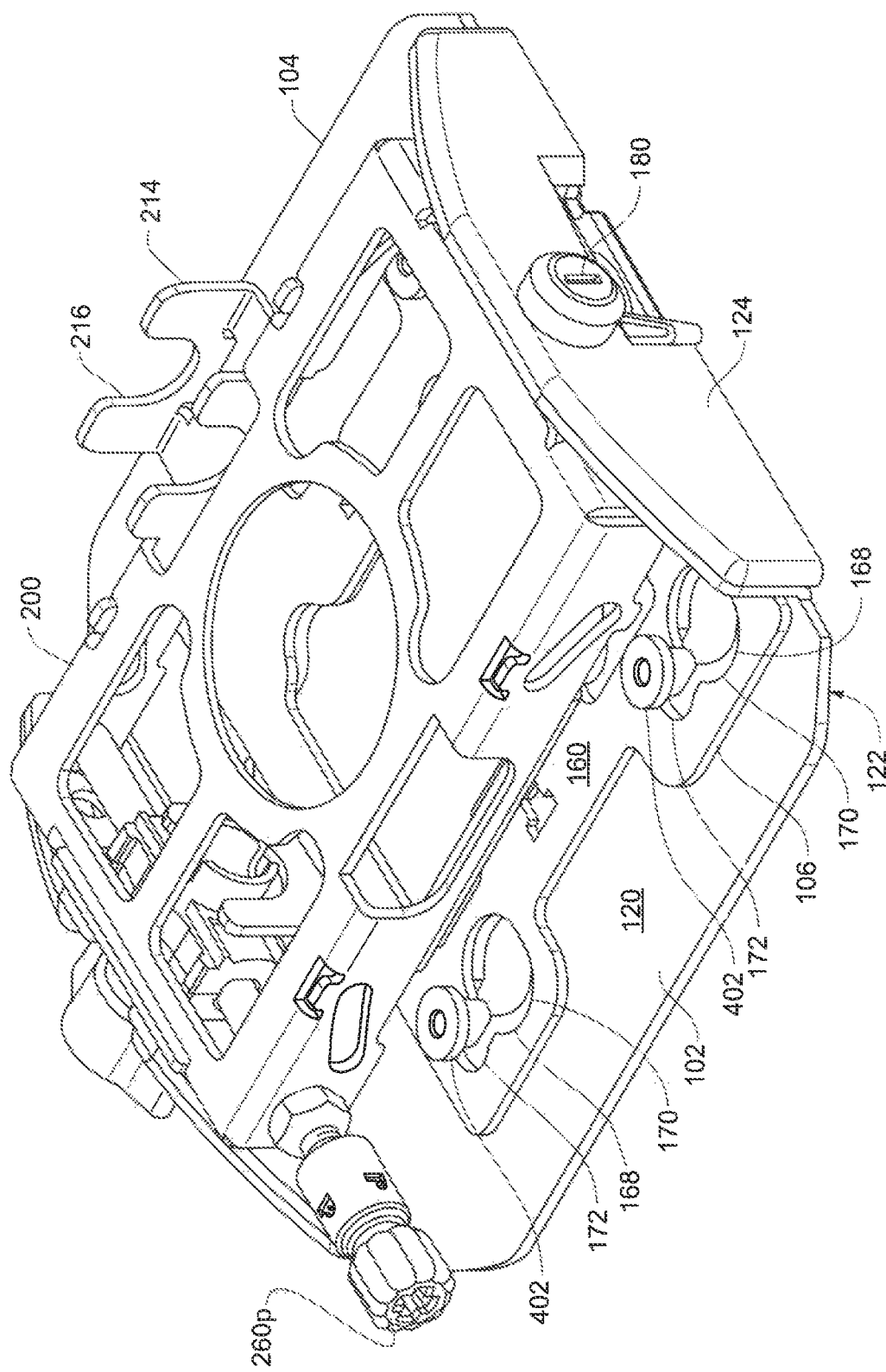
FIG. 16 is an isometric view of an intermediate frame, a base plate, locking plate and lock assembly portions of a projector mount.
Figure 17:
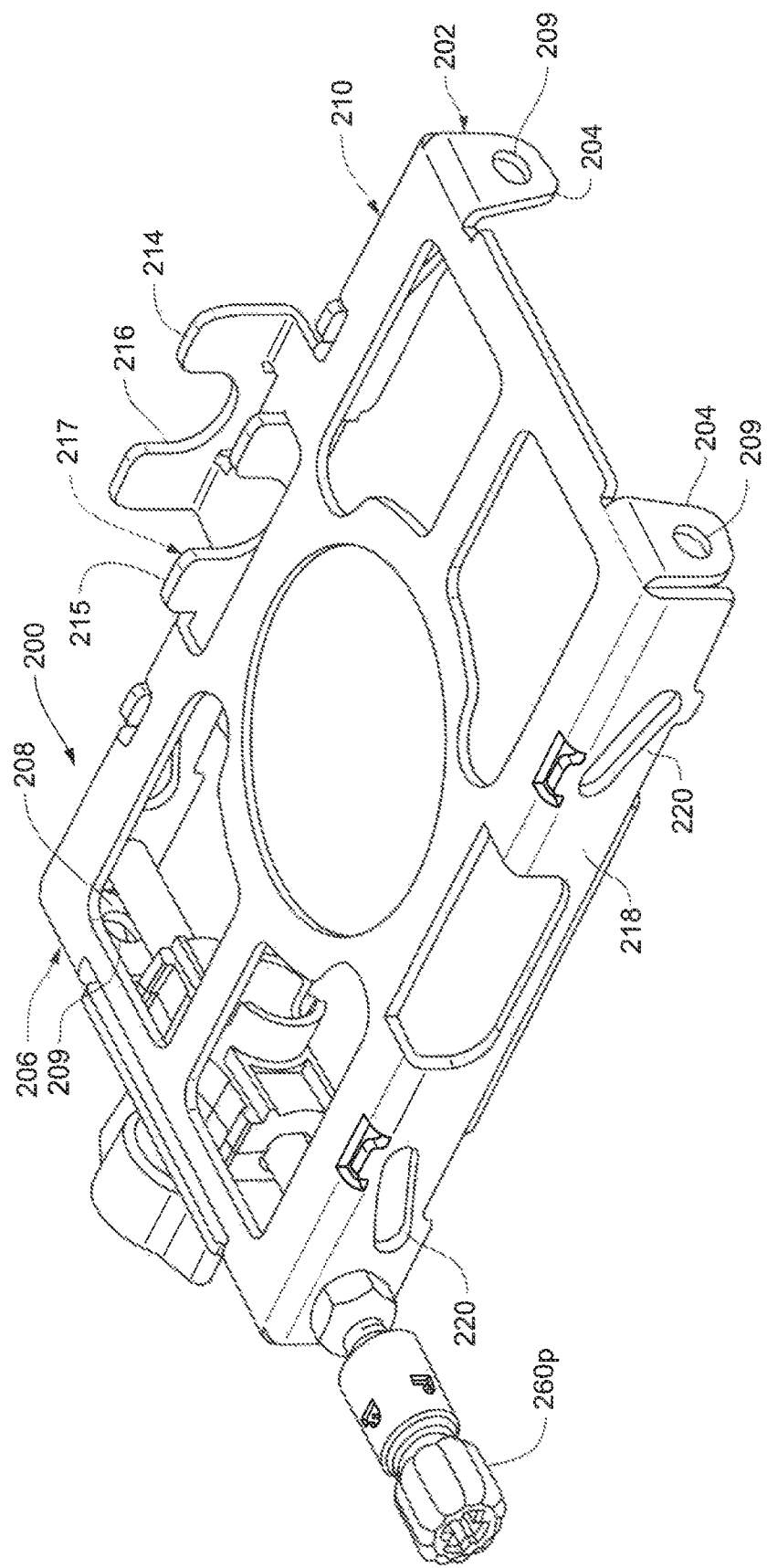
FIG. 17 is an isometric view of an intermediate frame, depicted with a device orientation adjustment assembly.
Figure 18:
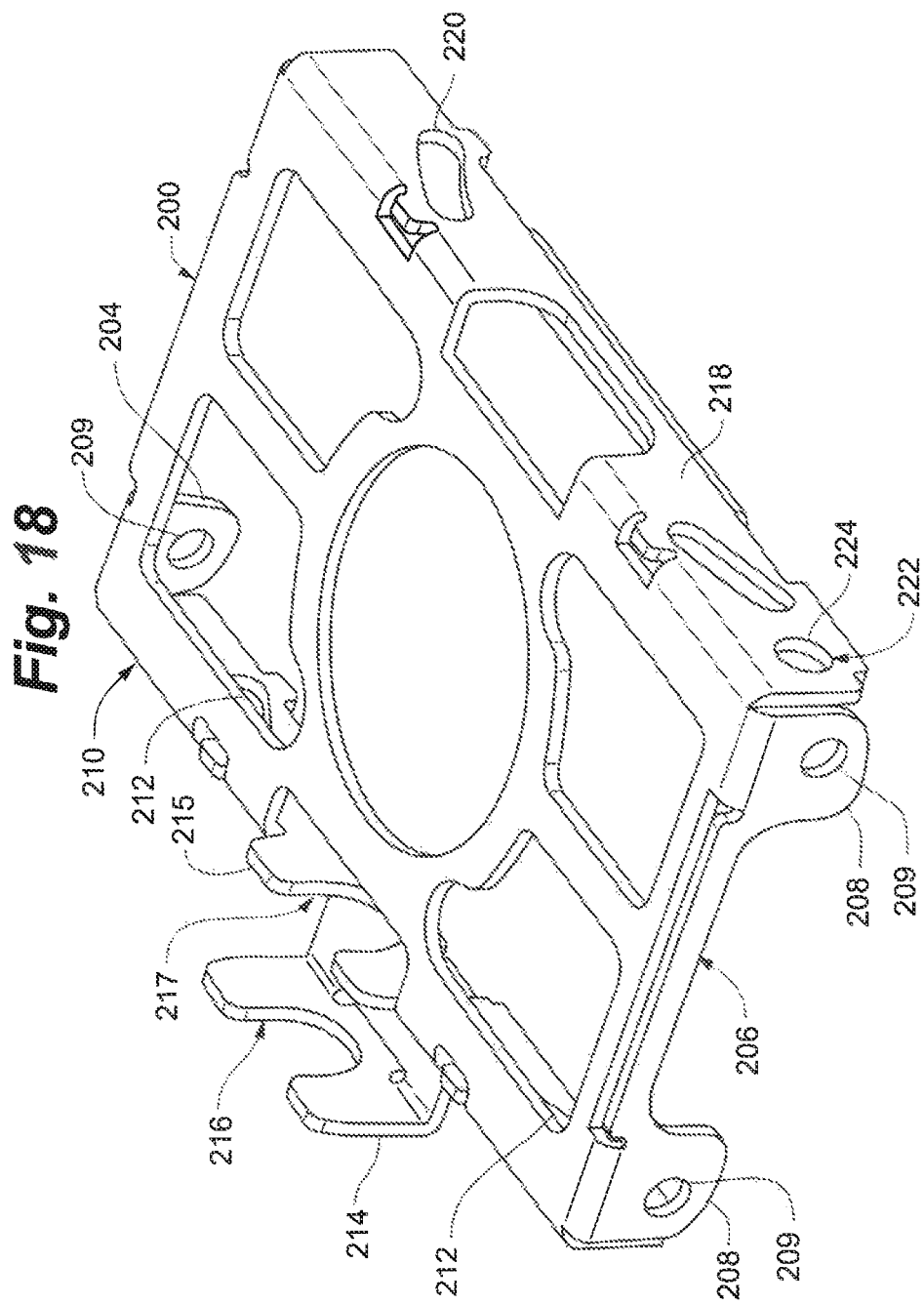
FIG. 18 is another isometric view of an intermediate frame.
Figure 19:
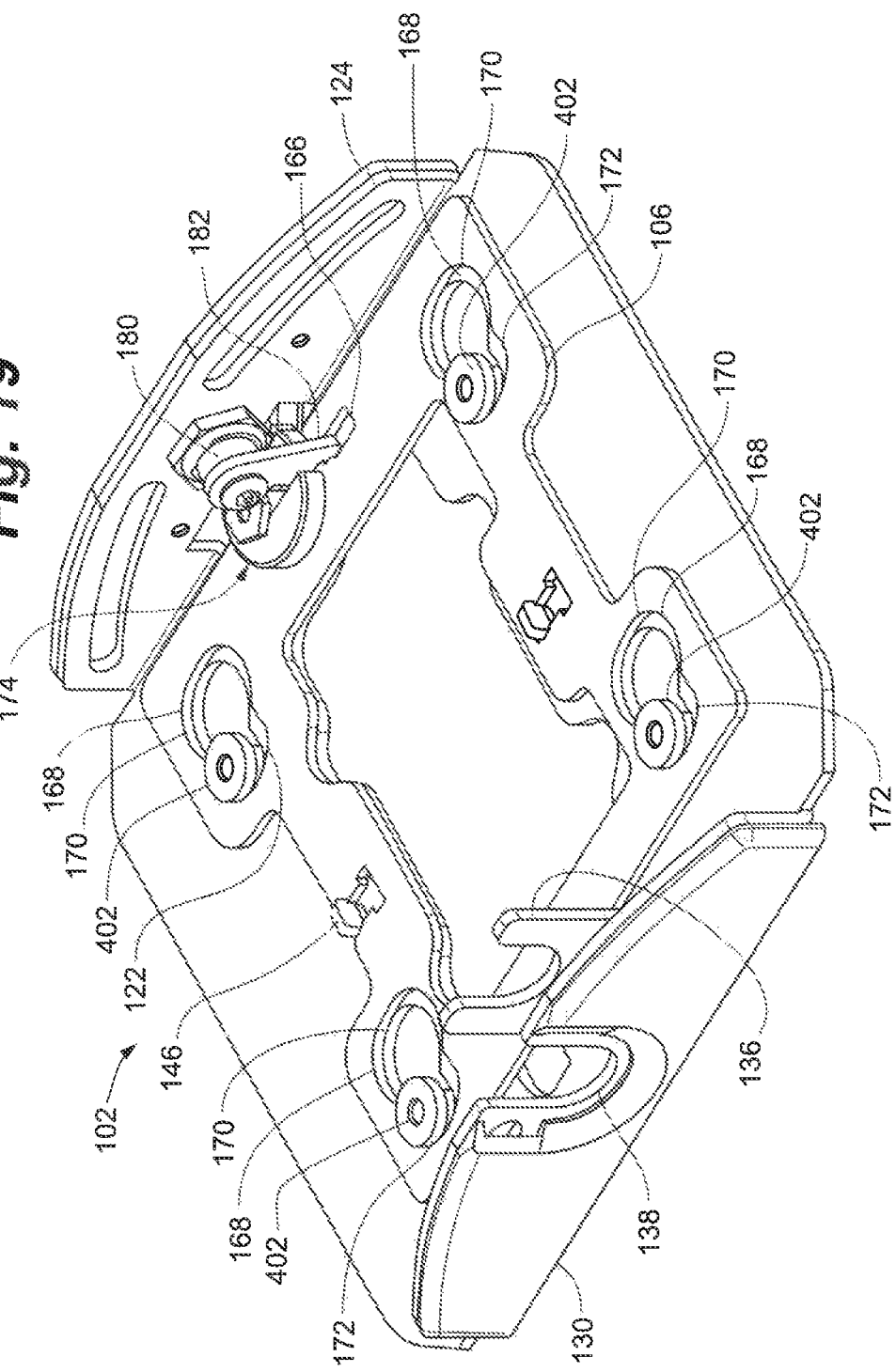
FIG. 19 is an isometric view of a base plate, locking plate and lock assembly portions of a projector mount.
Figure 20:
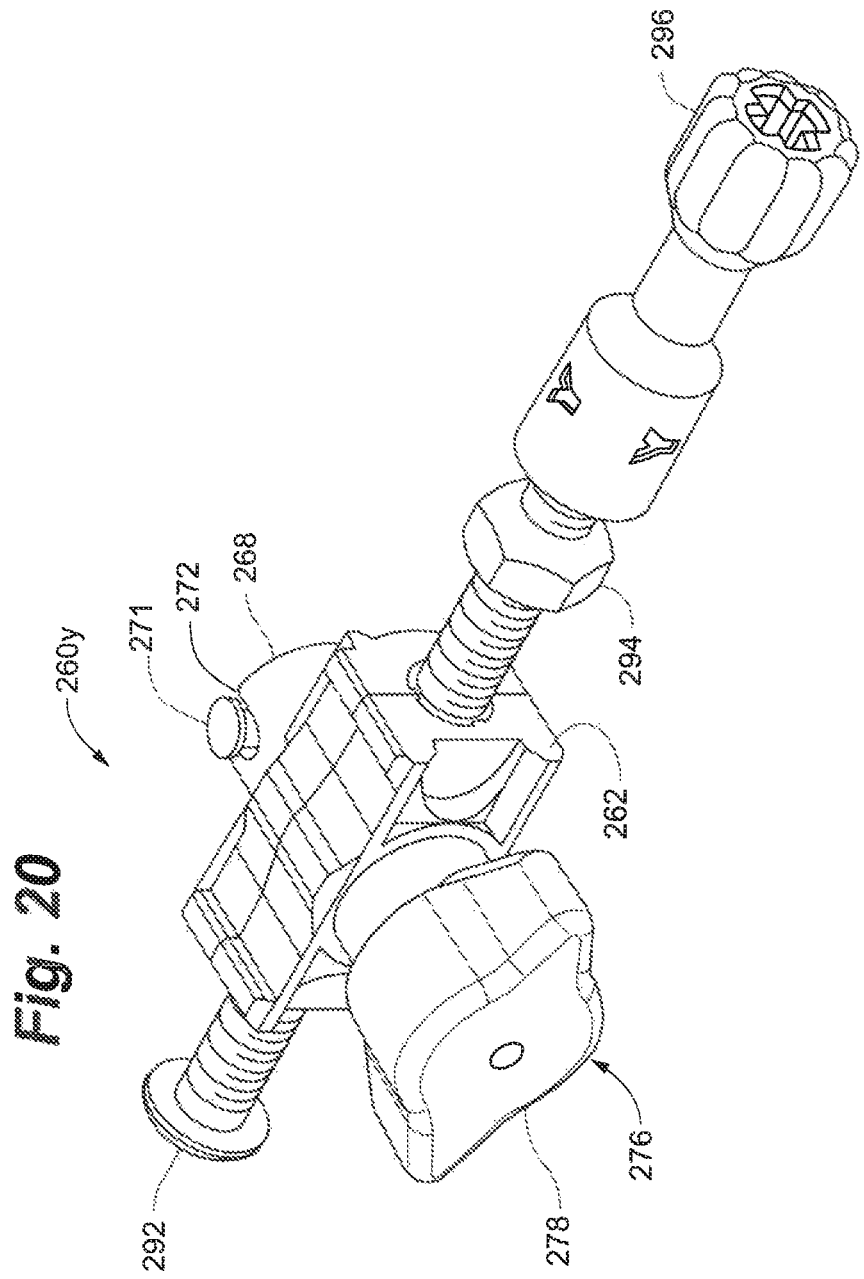
FIG. 20 is an isometric view of a device orientation adjustment assembly.
Figure 21:
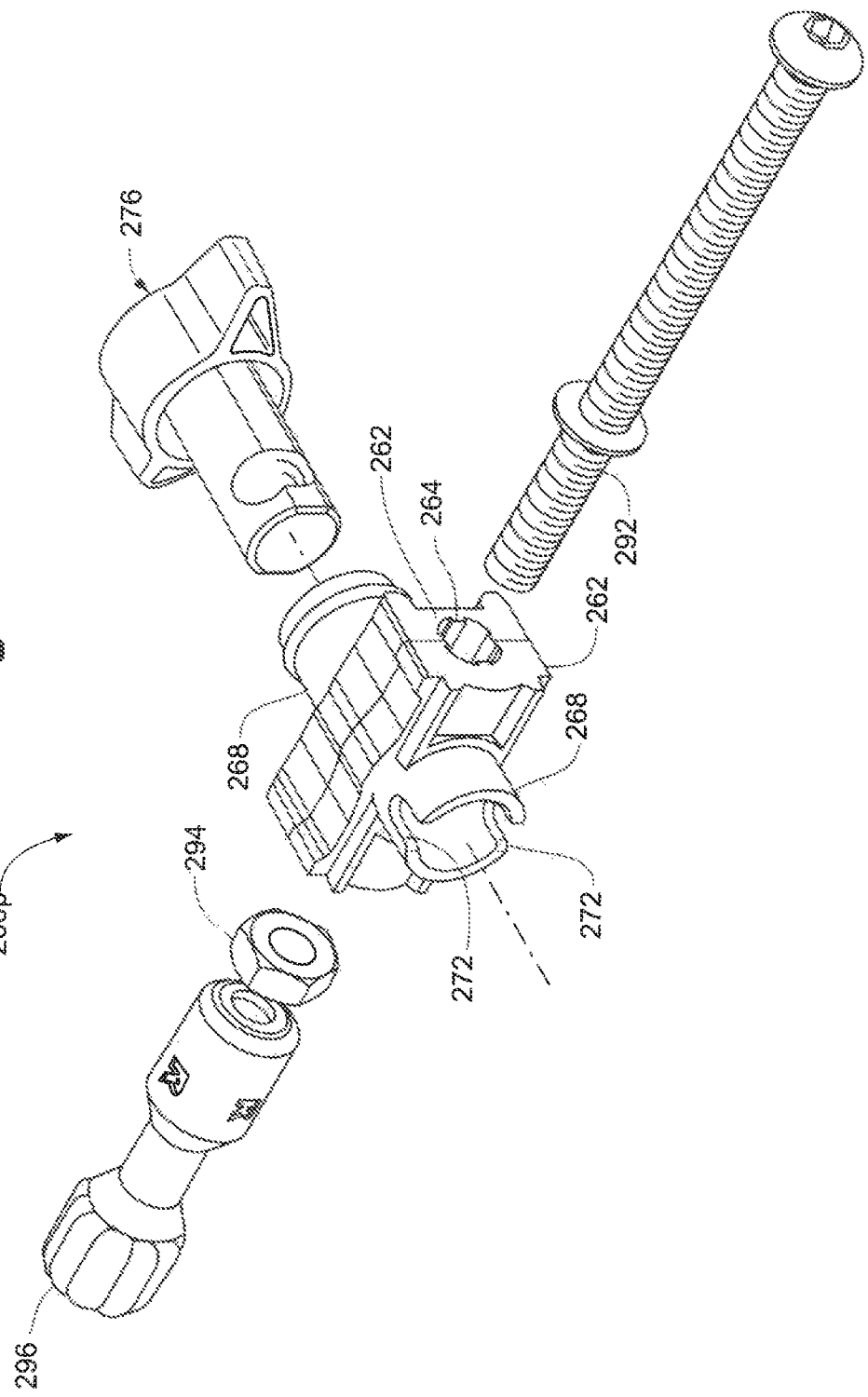
FIG. 21 is an isometric exploded view of another device orientation adjustment assembly.
Figure 22:
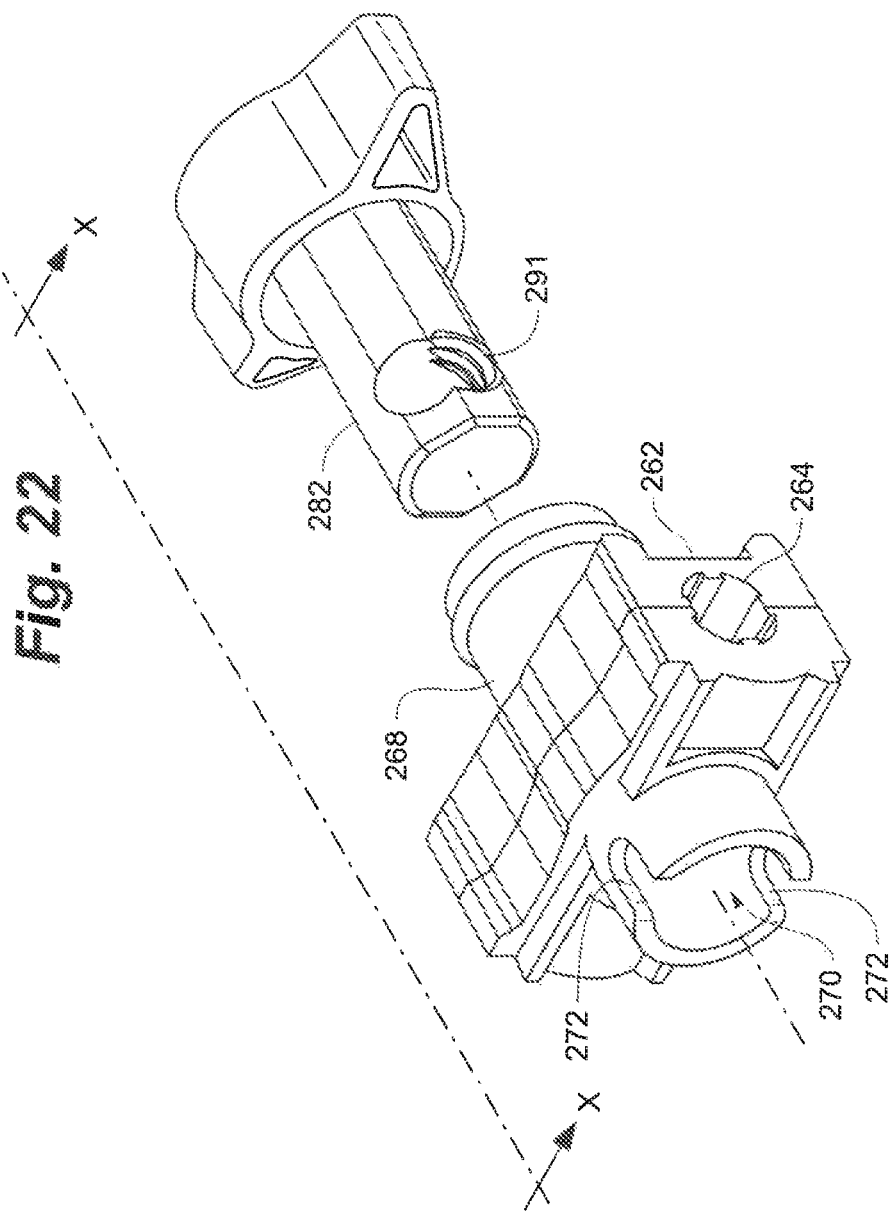
FIG. 22 is a close-up view of portions of FIG. 21.
Figure 23:
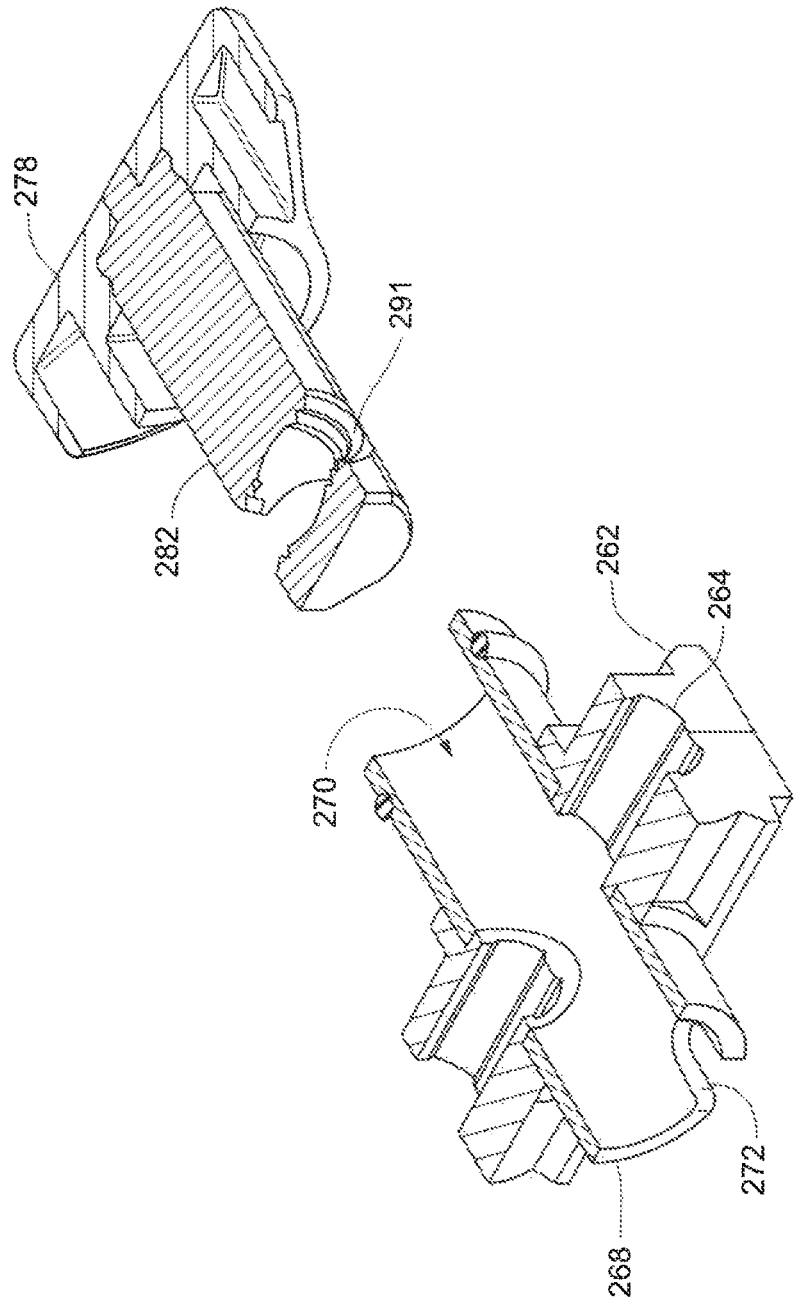
FIG. 23 is an isometric cross-section taken at section X-X of FIG. 22.
Figure 24:
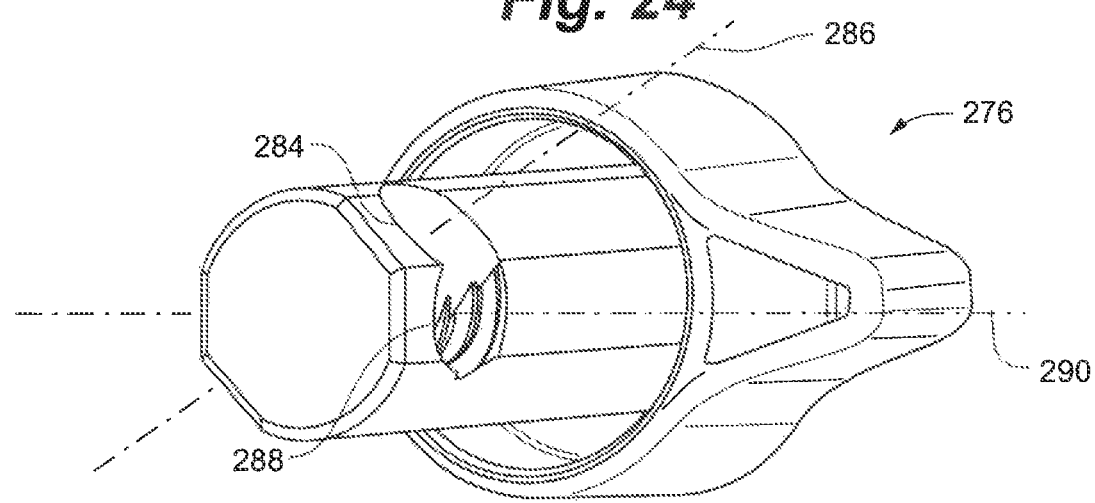
FIG. 24 is an isometric view of an adjustment selector.

Referring now to FIGS. 16-18, upper frame 240 includes a yaw adjustment receiving means 242, a roll adjustment receiving means 244, a plurality of tabs 246 having bores disposed therein which facilitate adjustably coupling upper frame 240 and intermediate frame 200 by way of slots 212, 220 to provide roll adjustment of projector mount 100. Suitable fasteners for coupling upper frame 240 to intermediate frame 200 may comprise bolts, screws, rivets, or similar which allow upper frame 240 to be adjustably positioned with respect to intermediate frame 200. Also included in upper frame 240 is a plurality of slots 248 which facilitate adjustably coupling intermediate frame 200 and upper frame 240 to provide yaw adjustment of projector mount 100.

Referring now to at least FIGS. 8-10, 21, and 22, projector mount 100 includes one or more device orientation adjustment assemblies 260, such as pitch adjustment assembly 260p, roll adjustment assembly 260r, and/or yaw adjustment assembly 260y. Each device orientation adjustment assembly 260p, 260r, 260y, is configured to provide macro and micro adjustability of the position of projector mount 100.

Generally, each of device orientation adjustment assemblies 260p, 260r, 260y, includes a body 262 having a longitudinal bore 264 with tube 268 oriented transverse to, and intersecting, longitudinal bore 264. Tube 268 defines an inner bore 270, with a transverse slot 272 at a distal end of tube 268. Body 262 is pinned in position between structures in mount 100 via a pin 271 received in slot 272 so as to prevent rotation of body 262 about inner bore 270.

Figure 25:
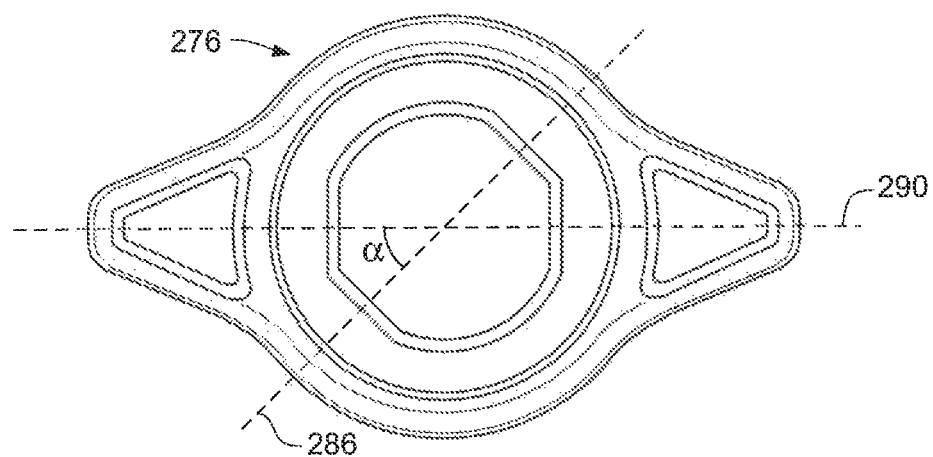
FIG. 25 is a front elevation view of FIG. 24.

An adjustment selector 276 is provided for switching device orientation adjustment assembly 260 between a macro (or coarse) adjustment mode, and a micro (or fine) adjustment mode. Adjustment selector 276 is received in tube 268 and includes a knob 278 and a shaft 282. Shaft 282 is received in inner bore 270 of tube 268, with shaft 282 including a first non-threaded bore 284 defined by a first axis 286, and a second intersecting threaded bore 288 defined by a second axis 290. As best depicted in FIG. 25, first axis 286 and second axis 290 are separated by an angle α. As depicted in FIG. 25, α is approximately forty-five degrees, although other angles may be used.

A threaded lead screw 292 is received through first bore 284 and second bore 288, and has one or more locknuts 294 and a knob 296. As will be described below, by rotating adjustment selector 276, threaded lead screw 292 is selectively engageable with the threads of threaded bore 288 in order to enable either course or fine adjustment of pitch, roll, and yaw of a projector 400 attached to projector mount 100.

Each of device orientation adjustment assemblies 260 is configured for both macro and micro adjustability of the position of projector mount 100, with adjustment selector 276 being operable to switch between macro and micro adjustment modes. As depicted in FIGS. 27 and 28, in the macro adjustment mode first bore 284 is aligned with longitudinal bore 264 of body 262, such that lead screw 292 is disengaged from body 262, tube 268 and adjustment selector 276. In this position, the orientation of projector 400 may be adjusted by simply grasping projector 400 and urging projector 400 in the desired direction of adjustment. Once the approximate orientation of projector 400 is achieved, adjustment selector 276 is moved to the micro adjustment mode for final orientation of projector 400.

As depicted in FIGS. 20-23, in the micro adjustment mode adjustment selector 276 is oriented such that second bore 288 is aligned with longitudinal bore 264 of body 262 and so that the threads of lead screw 292 are engaged with threads 291 in second bore 288. The orientation of projector 400 may be adjusted by rotating lead screw 292 via knob 296. In the micro adjustment mode, the orientation of projector 400 is fixed unless knob 296 is operated due to engagement of the threads of lead screw 292 with threads 291 in shaft 282.

Projector mount 100 further includes a support structure interface 300, including a plate 300 having a plurality of bores 304 therein, fasteners 306, a yaw adjustment coupling means 308, and means 310 for coupling with a support structure. Support structure interface 300 is operably coupleable to slots 248 of upper frame 240 and operably coupleable to yaw adjustment assembly 260 via means 308. Support structure interface 300 is configured to couple with a support structure assembly 330, such as a ceiling or wall mount, as depicted in FIGS. 30 and 31.

Support structure assembly 330 as depicted in FIGS. 30 and 31, generally includes wall interface 450, body portion 452, which includes rails 454, 456, and distal end member 458, as well as rail interface 460, and column 462. Rails 454, 456 extend between wall interface 450 and distal end member 458. Each rail 454, 456 presents an upwardly directed flange 464. Rail interface 460 generally includes base plate 466 with downwardly oriented flanges 468 at opposing edges, so as to overlap flanges 464. Base plate 466 is selectively slidable on rails 454, 456 along a longitudinal axis Z-Z of support structure assembly 330. Base plate 464 can be secured to rails 454, 456 in a selected position along axis Z-Z with wing nuts 470 coupled with associated clamps (not depicted).

Rail interface 460 further includes column interface 472 which is selectively rotatably coupled to base plate 466 via fasteners 474 which are slidable in slots 476 defined in base plate 464. Fasteners 474 can be loosened to permit rotation of column interface 472 relative to base plate 464, or tightened to fix column interface 472 in place relative to base plate 464.

Column interface 472 includes upstanding cylindrical portion 478 defining bore 480, receiving column 462 therethrough. Column 462 is slidably movable in bore 480, but can be fixed in a selected vertical position with fasteners 482 extending through cylindrical portion 478 and apertures 484 in column 462. Column 462 is fixed to support structure interface 300.

In operation, projector mount 100 is operable to adjust the orientation of projector 400 in one or more of roll, pitch and yaw with respect to the fixed reference point of support structure assembly 330.

Referring to pitch adjustment assembly 260p, lead screw 292 is coupled to intermediate frame 200 via bores 224 disposed in third side 210 and fourth side 218 of intermediate frame 200. With projector mount 100 fully assembled, tube 268 of pitch adjustment assembly 260p is coupled to base plate 104 via second upright 130 and support upright 136. Pitch adjustment assembly 260p provides adjustment of pitch between base plate 104 and intermediate frame 200, such that adjustment of pitch adjustment assembly 260p causes projector 400, base plate 104 and locking plate 106 to pitch with respect to intermediate frame 200, upper frame 240, support structure interface 300 and support structure assembly 330.

Referring to roll adjustment assembly 260r, lead screw 292 is coupled to upper frame 240 via roll adjustment receiving means 244. With projector mount 100 fully assembled, tube 268 of roll adjustment assembly 260r is coupled to intermediate frame 200 via support uprights 214, 215. Roll adjustment assembly 260r therefore provides adjustment of roll between intermediate frame 200 and upper frame 240, such that adjustment of roll adjustment assembly 260r causes projector 400, base plate 104, locking plate 106 and intermediate frame 200 to roll with respect to upper frame 240, support structure interface 300, and support structure assembly 330.

Referring to yaw adjustment assembly 260y, lead screw 292 is coupled to upper frame 240 via yaw adjustment receiving means 242. With projector mount 100 fully assembled, tube 268 of yaw adjustment assembly 260y is coupled to support structure interface 300 via a pin or rivet secured between slot 272 on tube 268 and yaw adjustment coupling means 308 on support structure interface 300. Yaw adjustment assembly 260y therefore provides adjustment of yaw between upper frame 240 and support structure interface 300, such that adjustment of yaw adjustment assembly 260y causes projector 400, base plate 104, locking plate 106, intermediate frame 200 and upper frame 240 to yaw with respect to support structure interface 300 and support structure assembly 330.

Regarding support structure interface 300, projector mount 100 and projector 400 can be moved closer to, or away from, a projection screen 500 by sliding base plate 464 on rails 454, 456 along the longitudinal axis X1-X1 of support structure assembly 330, and securing it in the desired position. Projector 400 can be moved in a vertical direction relative to projection screen 500 by sliding column 462 in bore 480 and securing column 480 in position with fasteners 482. Projector 400 can be still further adjusted in yaw by rotating column interface 472 relative to base plate 466, and fixing it in place in the desired position with fasteners 474. In this way, yaw, vertical position, and spacing of projector 400 relative to projection screen 400 can be independently adjusted via support structure interface 330.

Various modifications to the embodiments of the inventions may be apparent to one of skill in the art upon reading this disclosure. For example, persons of ordinary skill in the relevant art will recognize that the various features described for the different embodiments of the inventions can be suitably combined, un-combined, and re-combined with other features, alone, or in different combinations, within the spirit of the invention. Likewise, the various features described above should all be regarded as example embodiments, rather than limitations to the scope or spirit of the inventions. Therefore, the above is not contemplated to limit the scope of the present inventions.

Persons of ordinary skill in the relevant arts will recognize that the inventions may comprise fewer features than illustrated in any individual embodiment described above. The embodiments described herein are not meant to be an exhaustive presentation of the ways in which the various features of the inventions may be combined. Accordingly, the embodiments are not mutually exclusive combinations of features; rather, the inventions may comprise a combination of different individual features selected from different individual embodiments, as understood by persons of ordinary skill in the art.

The invention claimed is:

1. A mount for a projector, the mount comprising:
    a support structure interface; and
    a projector interface, the projector interface and the support structure interface coupled by an adjustment mechanism including at least a pitch adjustment assembly, and a roll adjustment assembly, wherein at least one of the pitch adjustment assembly or the roll adjustment assembly includes a control mechanism, the control mechanism enabling selection between a first mode in which the projector is positionable about a rotation axis by hand, and a second mode in which the projector is positionable about the rotation axis using the pitch adjustment assembly or the roll adjustment assembly, wherein the pitch adjustment assembly or the roll adjustment assembly includes a rotatable lead screw, and the projector is positioned about the rotation axis in the second mode by rotating the lead screw, wherein the control mechanism includes a rotatable knob, and wherein rotation of the rotatable knob shifts the control mechanism between the first mode and the second mode selectively engaging and disengaging the lead screw.

2. The mount of claim 1, wherein the projector interface further comprises a yaw adjustment assembly.

3. The mount of claim 2, wherein the yaw adjustment assembly includes a control mechanism, the control mechanism enabling selection between a first mode in which the projector is positionable about the yaw axis by hand, and a second mode in which the projector is positionable about the yaw axis using the yaw adjustment assembly.

4. The mount of claim 3, wherein the yaw adjustment assembly includes a rotatable lead screw, and the projector is positioned about the yaw axis in the second mode by rotating the lead screw.

5. The mount of claim 3, wherein the control mechanism of the yaw mechanism includes a rotatable knob, and wherein rotation of the rotatable knob shifts the control mechanism between the first mode and the second mode.

6. The mount of claim 1, further comprising a support structure assembly operably coupled to the support structure interface.

7. The mount of claim 6, wherein the support structure assembly includes an arm assembly, the support structure interface being selectively positionable along the arm assembly to adjust a distance of the projector from a screen.

8. The mount of claim 6, wherein the support structure interface is operably coupled to the support structure assembly with a column so as to enable selective vertical shifting of the support structure interface relative to the support structure assembly.

9. A projection system, the system comprising:
    a projector; and
    a mount for attaching the projector to a structure, the mount comprising:
        a support structure interface; and
        a projector interface, the projector interface and the support structure interface coupled by an adjustment mechanism including at least a pitch adjustment assembly, and a roll adjustment assembly, wherein at least one of the pitch adjustment assembly or the roll adjustment assembly includes a control mechanism, the control mechanism enabling selection between a first mode in which the projector is positionable about a rotation axis by hand, and a second mode in which the projector is positionable about the rotation axis using the pitch adjustment assembly or the roll adjustment assembly, wherein the pitch adjustment assembly or the roll adjustment assembly includes a rotatable lead screw, and the projector is positioned about the rotation axis in the second mode by rotating the lead screw, wherein the control mechanism includes a rotatable knob, and wherein rotation of the rotatable knob shifts the control mechanism between the first mode and the second mode by selectively engaging and disengaging the lead screw.

10. The system of claim 9, wherein the projector interface further comprises a yaw adjustment assembly.

11. The system of claim 10, wherein the yaw adjustment assembly includes a control mechanism, the control mechanism enabling selection between a first mode in which the projector is positionable about the yaw axis by hand, and a second mode in which the projector is positionable about the yaw axis using the yaw adjustment assembly.

12. The mount of claim 11, wherein the yaw adjustment assembly includes a rotatable lead screw, and the projector is positioned about the yaw axis in the second mode by rotating the lead screw.

13. The system of claim 11, wherein the control mechanism of the yaw mechanism includes a rotatable knob, and wherein rotation of the rotatable knob shifts the control mechanism between the first mode and the second mode.

\* \* \* \* \*